United States Patent
Fujii

(10) Patent No.: US 9,879,146 B2
(45) Date of Patent: Jan. 30, 2018

(54) PIGMENT DISPERSION FOR INK JETTING, METHOD OF PRODUCING THE SAME, INK SET, AND IMAGE FORMING METHOD

(71) Applicant: FUJIFILM CORPORATION, Minato-ku, Tokyo (JP)

(72) Inventor: Yusuke Fujii, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 125 days.

(21) Appl. No.: 15/005,007

(22) Filed: Jan. 25, 2016

(65) Prior Publication Data

US 2016/0289471 A1 Oct. 6, 2016

(30) Foreign Application Priority Data

Mar. 30, 2015 (JP) ................. 2015-069850

(51) Int. Cl.
*C09D 11/322* (2014.01)
*C09D 11/10* (2014.01)
(Continued)

(52) U.S. Cl.
CPC ............ *C09D 11/322* (2013.01); *C09D 11/10* (2013.01); *C09D 11/54* (2013.01); *B41J 2/01* (2013.01)

(58) Field of Classification Search
CPC ..... C09D 11/322; C09D 11/326; C09D 11/36; C09D 11/40; C09D 11/54; B41J 2/01
See application file for complete search history.

(56) References Cited

U.S. PATENT DOCUMENTS

2013/0065028 A1\* 3/2013 Fujii ................ C09D 7/001
428/195.1
2013/0215175 A1\* 8/2013 Ozawa ............... C09D 11/30
347/13

(Continued)

FOREIGN PATENT DOCUMENTS

| JP | H11-310715 A | 11/1999 |
|---|---|---|
| JP | 2009-216952 A | 9/2009 |
| JP | 2013-91704 A | 5/2013 |

OTHER PUBLICATIONS

European Extended Search Report dated May 2, 2016 in the corresponding European Patent Application No. 16153346. The EESR is submitted now in order to supplement the understanding of the cited references which are bing disclosed in the instant Information Disclosure Statement.

*Primary Examiner* — Thinh H Nguyen

(74) *Attorney, Agent, or Firm* — SOLARIS Intellectual Property Group, PLLC

(57) ABSTRACT

A pigment dispersion for ink jetting, including: a pigment (A) represented by the following Formula (A); a pigment (B) represented by the following Formula (B); and water, wherein a content mass ratio of the pigment (A) to the pigment (B) is higher than 1.0. In Formula (A), each of two $R^1$s represents a cyano group and each of two $R^2$s represents a hydrogen atom, or each of two $R^1$s represents a hydrogen atom and each of two $R^2$s represents a tertiary butyl group. In Formula (B), each of two $R^3$s represents a hydrogen atom and each of two $R^4$s represents a chlorine atom, each of two $R^3$s represents a hydrogen atom and each of two $R^4$s represents a hydrogen atom, or each of two $R^3$s represents a hydrogen atom and each of two $R^4$s represents a phenyl group.

(Continued)

-continued

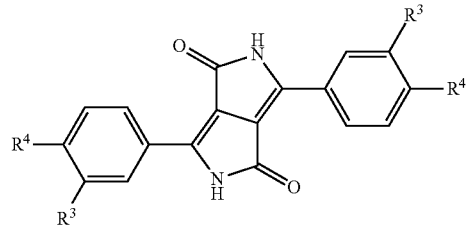

(B)

14 Claims, 1 Drawing Sheet

(51) Int. Cl.
C09D 11/54 (2014.01)
B41J 2/01 (2006.01)

(56) References Cited

U.S. PATENT DOCUMENTS

2014/0011917 A1 1/2014 Yokoyama et al.
2014/0349087 A1 11/2014 Jung et al.

* cited by examiner

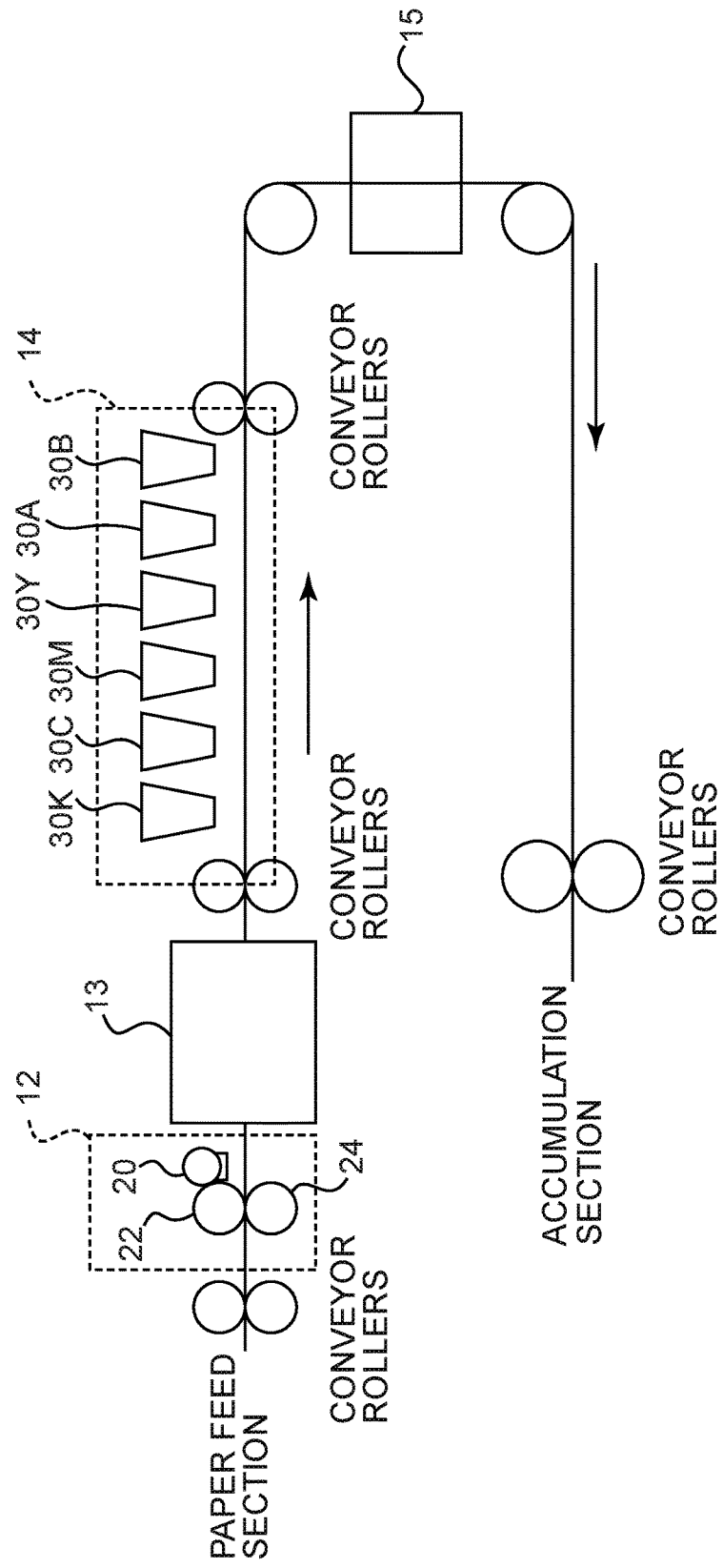

PIGMENT DISPERSION FOR INK JETTING, METHOD OF PRODUCING THE SAME, INK SET, AND IMAGE FORMING METHOD

CROSS-REFERENCE TO RELATED APPLICATION

This application claims priority under 35 USC 119 from Japanese Patent Application No. 2015-069850, filed on Mar. 30, 2015, the disclosure of which is incorporated herein by reference in its entirety.

BACKGROUND

Technical Field

The present invention relates to a pigment dispersion for ink jetting, a method of producing the same, an ink set, and an image forming method.

Related Art

In image formation by an inkjet method, a pigment dispersion prepared by dispersing a pigment in a liquid is used as an ink.

For example, as an inkjet ink using, as a pigment, C. I. (Colour Index) Pigment Orange 71, an inkjet ink which contains C. I. Pigment Orange 71, a 1,2-alkanediol having 4 or more carbon atoms, and a specific alcohol compound is known (see, for example, Japanese Patent Application Laid-Open (JP-A) No. 2013-91704).

Further, pigments are also used for coloring color filters which are used in liquid crystal display devices and the like.

For example, a red resin composition prepared by dispersing a red pigment and C. I. Pigment Orange 71 in a resin and a method of producing a color filter using this red resin composition are known (see, for example, JP-A No. H11-310715).

SUMMARY OF THE INVENTION

Meanwhile, from the viewpoints of reduction in environmental burden, improvement in operability, and the like, there are cases in which a water-based pigment dispersion (ink) that contains water as the dispersion medium is used as the pigment dispersion for ink jetting (ink) used for forming an image by an inkjet method.

However, among pigments, particularly, C. I. Pigment Orange 71 and C. I. Pigment Orange 73 are both pigments that are difficult to disperse in a medium containing water (hereinafter, also referred to as "water-based medium"). The dispersibility of a pigment in a water-based medium has correlation with the storage stability and jetting stability of the pigment dispersion obtained by dispersing the pigment in the water-based medium.

Accordingly, with regard to the pigment dispersion liquid containing C. I. Pigment Orange 71 or C. I. Pigment Orange 73, and water (for example, the ink described in JP-A No. 2013-91704), improvements in storage stability and jetting stability are required.

Here, the term "jetting stability" refers to the property of being able to stably jet a pigment dispersion from an inkjet head. Evaluation of jetting stability is performed, for example, by evaluating "continuous jettability", which is the property of being able to perform continuous jetting from an inkjet head.

The red resin composition described in JP-A No. H11-310715 is not a water-based composition but is a solvent-based composition that does not contain water but contains a solvent. Further, the red resin composition described in JP-A No. H11-310715 is a red composition containing a red pigment as the main pigment. Accordingly, in JP-A No. H11-310715, the dispersibility of C. I. Pigment Orange 71 itself in a water-based medium is not noticed at all.

The present invention has been made in view of the above circumstances and aims to accomplish the following object.

Namely, an object of the invention is to provide a pigment dispersion for ink jetting that exhibits excellent storage stability and excellent jetting stability, a method of producing the same, and an ink set and an image forming method using the pigment dispersion for ink jetting.

Embodiments for achieving the object are, for example, as follows.

<1> A pigment dispersion for ink jetting, comprising:
a pigment (A) represented by the following Formula (A);
a pigment (B) represented by the following Formula (B); and
water,
wherein a content mass ratio of the pigment (A) to the pigment (B) is higher than 1.0:

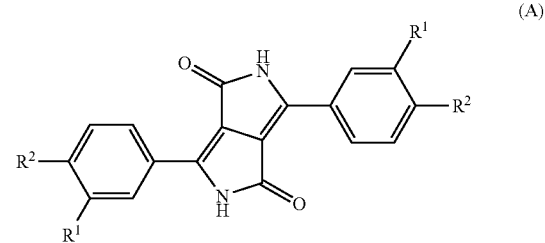

wherein, in Formula (A), each of two $R^1$s represents a cyano group and each of two $R^2$s represents a hydrogen atom, or each of two $R^1$s represents a hydrogen atom and each of two $R^2$s represents a tertiary butyl group,

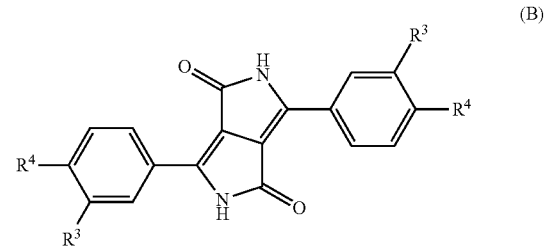

wherein, in Formula (B), each of two $R^3$s represents a hydrogen atom and each of two $R^4$s represents a chlorine atom, each of two $R^3$s represents a hydrogen atom and each of two $R^4$s represents a hydrogen atom, or each of two $R^3$s represents a hydrogen atom and each of two $R^4$s represents a phenyl group.

<2> The pigment dispersion for ink jetting according to <1>, wherein the content mass ratio of the pigment (A) to the pigment (B) is from 1.1 to 50.

<3> The pigment dispersion for ink jetting according to <1> or <2>, wherein the content mass ratio of the pigment (A) to the pigment (B) is from 1.1 to 25.

<4> The pigment dispersion for ink jetting according to any one of <1> to <3>, wherein the content mass ratio of the pigment (A) to the pigment (B) is from 1.1 to 10.

<5> The pigment dispersion for ink jetting according to any one of <1> to <4>, wherein, in Formula (A), each of two $R^1$s represents a cyano group and each of two $R^2$s represents a hydrogen atom.

<6> The pigment dispersion for ink jetting according to any one of <1> to <5>, wherein, in Formula (B), each of two $R^3$s represents a hydrogen atom and each of two $R^4$s represents a chlorine atom.

<7> The pigment dispersion for ink jetting according to any one of <1> to <6>, wherein, in Formula (A), each of two $R^1$s represents a cyano group and each of two $R^2$s represents a hydrogen atom, and wherein, in Formula (B), each of two $R^3$s represents a hydrogen atom and each of two $R^4$s represents a chlorine atom.

<8> The pigment dispersion for ink jetting according to any one of <1> to <7>, further comprising resin particles.

<9> The pigment dispersion for ink jetting according to any one of <1> to <8>, further comprising a resin dispersant.

<10> The pigment dispersion for ink jetting according to any one of <1> to <9>, further comprising a water soluble solvent.

<11> A method of producing the pigment dispersion for ink jetting according to any one of <1> to <10>, the method comprising a process of obtaining the pigment dispersion for ink jetting by mixing at least the pigment (A), the pigment (B), and water, and subjecting a resulting mixture to a dispersion treatment.

<12> The method according to <11>, wherein the process of obtaining the pigment dispersion for ink jetting comprises:
a process of obtaining a pigment mixture by mixing the pigment (A) and the pigment (B); and
a process of obtaining the pigment dispersion for ink jetting by mixing at least the pigment mixture and water, and subjecting a resulting mixture to a dispersion treatment.

<13> An ink set, comprising:
an ink that is the pigment dispersion for ink jetting according to any one of <1> to <10>; and
a treatment liquid containing an acid that aggregates components contained in the ink.

<14> An image forming method, comprising:
an ink application process of applying, onto a recording medium, an ink that is the pigment dispersion for ink jetting according to any one of <1> to <10>, by an inkjet method, to form an image; and
a treatment liquid application process of applying, onto the recording medium, a treatment liquid containing an acid that aggregates components contained in the ink.

According to the invention, a pigment dispersion for ink jetting that exhibits excellent storage stability and excellent jetting stability, a method of producing the same, and an ink set and an image forming method using the pigment dispersion for ink jetting are provided.

BRIEF DESCRIPTION OF THE DRAWING

FIG. 1 is a schematic configuration diagram showing an example of the structure of an inkjet recording apparatus used for carrying out image formation.

DETAILED DESCRIPTION OF THE INVENTION

Hereinafter, a pigment dispersion for ink jetting of the invention, a method of producing the same, and an ink set and an image forming method using the pigment dispersion for ink jetting are described in detail.

In the present specification, a numerical range described by using the term "to" denotes a range including numerical values described in front of and behind "to", as the minimum value and the maximum value, respectively.

In the specification, the concept of the term "(meth)acrylic acid" encompasses both acrylic acid and methacrylic acid, and the concept of the term "(meth)acrylate" encompasses both acrylate and methacrylate.

[Pigment Dispersion for Ink Jetting]

The pigment dispersion for ink jetting (hereinafter, also referred to as, simply, "pigment dispersion") of the invention contains pigment (A) represented by the following Formula (A), pigment (B) represented by the following Formula (B), and water, in which the content mass ratio of pigment (A) to pigment (B) (hereinafter, also referred to as the "content mass ratio [pigment (A)/pigment (B)]") is higher than 1.0.

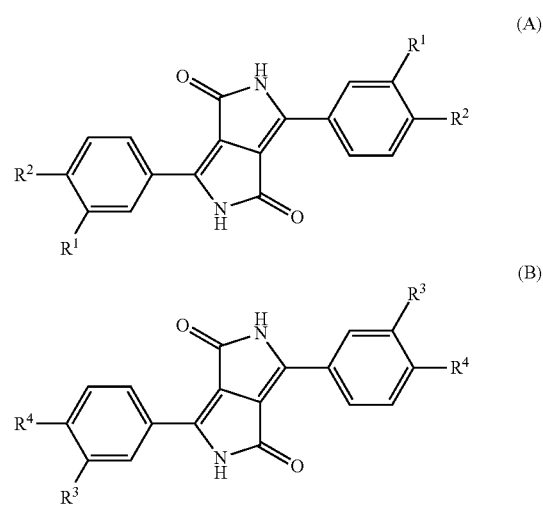

In Formula (A), each of two $R^1$s represents a cyano group and each of two $R^2$s represents a hydrogen atom, or each of two $R^1$s represents a hydrogen atom and each of two $R^2$s represents a tertiary butyl group.

In Formula (B), each of two $R^3$s represents a hydrogen atom and each of two $R^4$s represents a chlorine atom, each of two $R^3$s represents a hydrogen atom and each of two $R^4$s represents a hydrogen atom, or each of two $R^3$s represents a hydrogen atom and each of two $R^4$s represents a phenyl group.

In pigment (A), a pigment having a form in which each of two $R^1$s represents a cyano group and each of two $R^2$s represents a hydrogen atom is C. I. (Colour Index) Pigment Orange 71 (PO71).

In pigment (A), a pigment having a form in which each of two $R^1$s represents a hydrogen atom and each of two $R^2$s represents a tertiary butyl group is C. I. Pigment Orange 73 (PO73).

Namely, pigment (A) is PO71 or PO73.

In pigment (B), a pigment having a form in which each of two $R^3$s represents a hydrogen atom and each of two $R^4$s represents a chlorine atom is C. I. Pigment Red 254 (hereinafter also referred to as "PR254").

In pigment (B), a pigment having a form in which each of two $R^3$s represents a hydrogen atom and each of two $R^4$s represents a hydrogen atom is C. I. Pigment Red 255 (hereinafter also referred to as "PR255").

In pigment (B), a pigment having a form in which each of two $R^3$s represents a hydrogen atom and each of two $R^4$s represents a phenyl group is C. I. Pigment Red 264 (hereinafter also referred to as "PR264").

Namely, pigment (B) is PR254, PR255, or PR264.

The pigment dispersion for ink jetting of the invention is used as an inkjet ink (which may be referred to as "ink composition").

As described above, pigment (A) (PO71 or PO73) is a pigment which is difficult to disperse in a medium containing water (water-based medium). Therefore, with respect to a pigment dispersion containing pigment (A) and water, improvements in storage stability and jetting stability (stability in jetting from an inkjet head) are required.

In this regard, since the pigment dispersion of the invention contains pigment (B) in addition to pigment (A), the storage stability and jetting stability are improved, as compared with a pigment dispersion that contains pigment (A) but does not contain pigment (B).

Here, the stability in jetting from an inkjet head is evaluated by evaluating the property of continuous jetting from the inkjet head (see the Examples described below).

The reason why the above effects (improvements in storage stability and jetting stability) are exhibited in the pigment dispersion of the invention is guessed as follows.

As is evident from Formula (A) and Formula (B), pigment (A) and pigment (B) have the same skeleton (in detail, diketopyrrolopyrrole (DPP) skeleton). The difference between pigment (A) and pigment (B) is in the kinds of the substituents ($R^1$ to $R^4$), each of which substitutes for a hydrogen atom on the DPP skeleton. Namely, it can be said that pigment (A) and pigment (B) are similar but different. Accordingly, it is thought that, in the pigment dispersion of the invention, pigment (B) which is similar to but is different from pigment (A) functions as a synergist with respect to pigment (A), and thus, dispersion stability of pigment (A) in a water-based medium is improved, as compared with the case of containing pigment (A) but not containing pigment (B). It is thought that, in the pigment dispersion of the invention, due to this improvement in dispersion stability, the effects on improvement in storage stability and improvement in jetting stability are exhibited.

Further, in the pigment dispersion of the invention, the content mass ratio [pigment (A)/pigment (B)] is higher than 1.0. This means that the pigment dispersion of the invention is a pigment dispersion having an orange hue.

Regarding this orange hue, as a result of the investigation made by the present inventor, it has become clear that the image formed by using the pigment dispersion of the invention, which contains pigment (A) that serves as an orange pigment and pigment (B) that serves as a red pigment, provides an unexpected effect of rather improving the vividness of the orange hue, as compared with the image formed by using a pigment dispersion which contains pigment (A) but does not contain pigment (B).

Hereinafter, unless otherwise specifically stated, the "hue" means the orange hue. Further, unless otherwise specifically stated, the expression "the hue is improved" means that the vividness of the orange hue is improved.

The pigment dispersion of the invention may contain only one type of pigment (A) (namely, PO71 or PO73), or may contain two types thereof (namely, PO71 and PO73).

In a case in which the pigment dispersion of the invention contains two types of pigment (A), the content (content mass) of pigment (A) means the total content (total content mass) of the two types of pigment (A).

Further, the pigment dispersion of the invention may contain only one type of pigment (B) (namely, PR254, PR255, or PR264), or may contain two or more types thereof (namely, two or more selected from the group consisting of PR254, PR255, and PR264).

In a case in which the pigment dispersion of the invention contains two or more types of pigment (B), the content (content mass) of pigment (B) means the total content (total content mass) of the two or more types of pigment (B).

Namely, in this specification, the content mass ratio [pigment (A)/pigment (B)] means the ratio of the total content mass of at least one type of pigment (A) relative to the total content mass of at least one type of pigment (B).

Moreover, the "sum of the content of pigment (A) and the content of pigment (B)" described below means the sum of the total content of at least one type of pigment (A) and the total content of at least one type of pigment (B).

From the viewpoint of more effectively exhibiting the effects of the invention, it is preferable that the pigment dispersion of the invention contains only one type of pigment (A).

The content mass ratio [pigment (A)/pigment (B)] is preferably 1.1 or higher, more preferably 1.5 or higher, and particularly preferably 2.0 or higher, from the viewpoint of further improving the storage stability and hue.

The upper limit of the content mass ratio [pigment (A)/pigment (B)] is not particularly limited. From the viewpoint of further improving the storage stability, jetting stability, and hue, the content mass ratio [pigment (A)/pigment (B)] is preferably 50 or lower, more preferably 25 or lower, still more preferably 15 or lower, yet still more preferably 10 or lower, further preferably 8.0 or lower, and particularly preferably 6.0 or lower.

The content mass ratio [pigment (A)/pigment (B)] is preferably from 1.1 to 50, more preferably from 1.1 to 25, and particularly preferably from 1.1 to 10, from the viewpoint of further improving the storage stability, jetting stability, and hue.

It is preferable that the pigment dispersion of the invention contains resin particles, from the viewpoint of further improving the rub resistance of the image.

In general, in a case in which a pigment dispersion contains resin particles, the dispersion stability of the pigment is lower, and thus, the pigment dispersion has a tendency to exhibit low storage stability and low jetting stability, as compared with the case in which the pigment dispersion does not contain resin particles.

However, since the pigment dispersion of the invention contains not only pigment (A) but also pigment (B) as described above, even in a case in which the pigment dispersion of the invention further contains resin particles, the storage stability and jetting stability of the pigment dispersion are maintained high. In other words, in a case in which the pigment dispersion of the invention further contains resin particles, the improvement effects (the improvement effects on storage stability and jetting stability) due to pigment (B) are more remarkably exhibited (namely, more drastic improvements are obtained due to pigment (B)), as compared with the case in which the pigment dispersion of the invention does not contain resin particles.

Here, the term "resin particle" refers to a particle formed of a resin.

The resin particle is different from the resin dispersant, which covers at least a part of the surface of a pigment particle, in that it is a particle formed of a resin.

The resin particle is preferably a self-dispersing polymer particle having a carboxyl group, from the viewpoint of further improving the dispersion stability of this resin particle.

A preferable mode of the self-dispersing polymer particle having a carboxyl group is described below.

Hereinafter, the respective components capable of being incorporated in the pigment dispersion of the invention are explained.

<Pigment>

The pigment dispersion of the invention contains pigment (A) and pigment (B).

As described above, pigment (A) is PO71 or PO73. From the viewpoints of the dispersion stability of the pigment dispersion and the hue of the pigment dispersion, pigment (A) is particularly preferably PO71.

As described above, pigment (B) is PR254, PR255, or PR264. From the viewpoints of the dispersion stability of the pigment dispersion and the hue of the pigment dispersion, pigment (B) is particularly preferably PR254.

A particularly preferable mode of the pigment dispersion of the invention is a mode in which pigment (A) is PO71 and pigment (B) is PR254.

The content mass ratio [pigment (A)/pigment (B)] is higher than 1.0, as described above, and the preferable range thereof is also as described above.

The sum of the content of pigment (A) and the content of pigment (B) in the pigment dispersion of the invention is preferably from 0.5% by mass to 35% by mass, more preferably from 1% by mass to 30% by mass, still more preferably from 1% by mass to 20% by mass, yet still more preferably from 2% by mass to 10% by mass, and particularly preferably from 2% by mass to 6% by mass, with respect to the whole amount of the pigment dispersion, from the viewpoint of image density.

The pigment dispersion of the invention may contain one or more additional pigments other than pigment (A) or pigment (B). As the additional pigments, those selected as appropriate from known pigments described in JP-A No. 2012-162655, JP-A No. 2013-47311, and the like, can be used.

However, from the viewpoint of more effectively obtaining the effects of the invention, it is preferable that the pigment dispersion of the invention does not substantially contain an additional pigment other than pigment (A) or pigment (B). In a case in which the pigment dispersion contains an additional pigment, the content of the additional pigment is preferably 2% by mass or less, more preferably 1% by mass or less, and still more preferably 0.5% by mass or less, with respect to the whole amount of the pigment dispersion.

<Dispersant>

It is preferable that the pigment dispersion of the invention contains a dispersant that disperses pigment (A) and pigment (B).

The dispersant is preferably a resin dispersant.

The resin dispersant may be a water soluble resin dispersant formed of a water soluble resin, or may be a non-water soluble resin dispersant formed of a non-water soluble resin.

In this specification, the term "water soluble" refers to a property of being able to dissolve in water at a certain concentration or more. The "water solubility" is preferably the property of the dissolution amount of 5 g or more (more preferably, 10 g or more), with respect to 100 g of water at 25° C.

In a case in which the pigment dispersion of the invention contains a resin dispersant, it is preferable that the resin dispersant covers at least a part of the surface of the pigment particles formed of pigment (A) and pigment (B).

Hereinafter, the particles in which at least a part of the surface of the pigment particles formed of pigment (A) and pigment (B) is covered with a resin dispersant may be referred to as "resin-coated pigment particles".

As the method of covering at least a part of the surface of pigment particles with a resin dispersant, a conventionally known method, such as the method described in JP-A No. 2009-190379, may be used.

It is preferable that the resin dispersant has at least one hydrophilic structural unit and at least one hydrophobic structural unit.

Here, the hydrophilic structural unit is preferably a structural unit containing at least one hydrophilic group.

Examples of the hydrophilic group include a nonionic group, a carboxyl group, a sulfonic acid group, and a phosphoric acid group. A carboxyl group is preferable. Examples of the nonionic group include a hydroxyl group, an amido group (in which the nitrogen atom is unsubstituted), a group derived from an alkylene oxide polymer (for example, polyethylene oxide, polypropylene oxide, or the like), and a group derived from a sugar alcohol.

The content mass ratio [hydrophilic structural unit:hydrophobic structural unit] of the hydrophilic structural unit to the hydrophobic structural unit is preferably in a range of from 10:90 to 40:60, more preferably in a range of from 10:90 to 30:70, and particularly preferably in a range of from 10:90 to 25:75.

The hydrophilic structural unit is preferably a structural unit having an acidic group (for example, a carboxyl group, a sulfonic acid group, a phosphoric acid group, or the like), and more preferably a structural unit having a carboxyl group.

Examples of the structural unit having a carboxyl group include structural units derived from (meth)acrylic acid, β-carboxyethyl acrylate, fumaric acid, itaconic acid, maleic acid, crotonic acid, or the like. Among them, a structural unit derived from (meth)acrylic acid and a structural unit derived from β-carboxyethyl acrylate are preferable, and a structural unit derived from (meth)acrylic acid is more preferable.

Examples of the hydrophobic structural unit include a structural unit derived from a (meth)acrylic ester and a structural unit derived from an aromatic group-containing monomer.

Above all, structural units derived from at least one selected from the group consisting of a $C_{1-20}$ alkyl (meth)acrylate, benzyl (meth)acrylate, phenoxyethyl (meth)acrylate, and derivatives thereof are preferable, and a structural unit derived from benzyl (meth)acrylate is more preferable, as the hydrophobic structural unit.

The resin dispersant may contain one kind of these hydrophobic structural units singly, or may contain two or more kinds thereof.

As the resin dispersant, for example, a (meth)acrylic acid/benzyl (meth)acrylate copolymer, a (meth)acrylic acid/phenoxyethyl (meth)acrylate copolymer, or a copolymer of (meth)acrylic acid/phenoxyethyl (meth)acrylate/$C_{1-20}$ alkyl (meth)acrylate can be preferably used.

From the viewpoint of dispersibility, it is preferable that the resin dispersant has a hydrophilic structural unit having a carboxyl group.

The acid value of the resin dispersant is preferably from 90 mgKOH/g to 150 mgKOH/g, and more preferably from 100 mgKOH/g to 120 mgKOH/g.

Note that, the acid value can be measured by the method described in JIS Standards (JIS K 0070, 1992).

The weight average molecular weight of the resin dispersant is preferably from 1,000 to 100,000, more preferably from 3,000 to 50,000, and still more preferably from 5,000 to 40,000.

The weight average molecular weight can be measured by gel permeation chromatography (GPC). For the GPC, HLC- 8020 GPC (trade name, manufactured by Tosoh Corporation) is used, three columns of TSK GEL (registered trademark) SUPER MULTIPORE HZ-H (manufactured by Tosoh Corporation; 4.6 mmID×15 cm) are used as the column, and THF (tetrahydrofuran) is used as the eluate. For the conditions, the sample concentration is 0.45% by mass, the flow rate is 0.35 mL/min, the amount of sample injection is 10 μL, the measurement temperature is 40° C., and an RI detector is used. A calibration curve is prepared from 8 samples of the "Standard sample TSK standard, polystyrene": "F-40", "F-20", "F-4", "F-1", "A-5000", "A-2500", "A-1000", and "n-propylbenzene" (trade names, manufactured by Tosoh Corporation).

In a case in which the pigment dispersion of the invention contains a resin dispersant, the content mass ratio [p:s] of the pigment (p) to the resin dispersant (s) is preferably in a range of from 10:1 to 10:8, more preferably in a range of from 10:1 to 10:7, and still more preferably in a range of from 10:3 to 10:7.

The volume average particle diameter of the above-described resin-coated pigment particles (particles in which at least a part of the surface of the pigment particles formed of pigment (A) and pigment (B) is covered with a resin dispersant) in the dispersed state is preferably from 10 nm to 300 nm, more preferably from 50 nm to 250 nm, and still more preferably from 80 nm to 200 nm. When the volume average particle diameter is 300 nm or less, color reproducibility is favorable, and droplet jetting properties in jetting the pigment dispersion by an inkjet method are favorable. When the volume average particle diameter is 10 nm or more, lightfastness is favorable.

The volume average particle diameter of the resin-coated pigment particles in the dispersed state can be measured by using a NANOTRAC particle size distribution analyzer UPA-EX150 (trade name, manufactured by Nikkiso Co., Ltd.), in accordance with a dynamic light scattering method.

<Water>

The pigment dispersion of the invention contains water.

Namely, the pigment dispersion of the invention is a water-based composition. Therefore, the pigment dispersion of the invention is advantageous in terms of reduction in environmental burden, improvement in operability, and the like, as compared with a solvent-based composition that does not contain water but contains a solvent.

The content of water in the pigment dispersion of the invention is not particularly limited, but is preferably 40% by mass or higher, more preferably 50% by mass or higher, and still more preferably 60% by mass or higher, with respect to the whole amount of the pigment dispersion.

The upper limit of the content of water in the pigment dispersion of the invention can be determined as appropriate, considering the amounts of pigment (A), pigment (B), and the like. The content of water is preferably 99% by mass or lower, more preferably 95% by mass or lower, and particularly preferably 90% by mass or lower, with respect to the whole amount of the pigment dispersion.

<Water Soluble Solvent>

It is preferable that the pigment dispersion of the invention contains a water soluble solvent, from the viewpoint of further improving the jetting stability.

As the water soluble solvent, known water soluble solvents can be used without any particular limitation.

Examples of the water soluble solvent include glycols such as glycerin, 1,2,6-hexanetriol, trimethylolpropane, ethylene glycol, propylene glycol, diethylene glycol, triethylene glycol, tetraethylene glycol, pentaethylene glycol, or dipropylene glycol; polyhydric alcohols such as 2-butene-1,4-diol or an alkanediol such as 2-ethyl-1,3-hexanediol, 2-methyl-2,4-pentanediol, 1,2-octanediol, 1,2-hexanediol, 1,2-pentanediol, or 4-methyl-1,2-pentanediol; sugars or sugar alcohols, hyaluronic acids, alkyl alcohols having from 1 to 4 carbon atoms, glycol ethers, 2-pyrrolidone, and N-methyl-2-pyrrolidone, which are described in paragraph 0116 of JP-A No. 2011-42150; and the like.

Examples of the water soluble solvent further include compounds represented by the following Structural Formula (I).

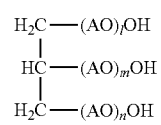

Structural Formula (I)

In Structural Formula (I), each of l, m, and n independently represents an integer of 0 or more, and l, m, and n satisfy: l+m+n=0 to 15. Above all, l+m+n is preferably in a range of from 3 to 12, and more preferably in a range of from 3 to 10. In Structural Formula (I), AO represents an ethyleneoxy group or a propyleneoxy group. Among them, a propyleneoxy group is preferable. In a case in which l+m+n≥2 is satisfied, the two or more AOs may be the same or different from each other.

Preferable examples of the compound represented by Structural Formula (I) include glycerin and an alkylene oxide adduct of glycerin.

Examples of the compound represented by Structural Formula (I) include the compounds shown below. In the following, the numerical value in parentheses represents an SP value.

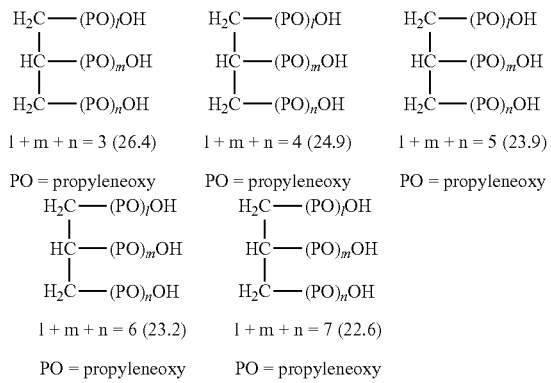

nC$_4$H$_9$O(AO)$_4$—H
(AO=EO or PO (EO:PO=1:1), SP value=20.1)
nC$_4$H$_9$O(AO)$_{10}$—H
(AO=EO or PO (EO:PO=1:1), SP value=18.8)
HO (A'O)$_{40}$—H
(A'O=EO or PO (EO:PO=1:3), SP value=18.7)
HO(A"O)$_{55}$—H
(A"O=EO or PO (EO:PO=5:6), SP value=18.8)
HO(PO)$_3$—H (SP value=24.7)
HO(PO)$_7$—H (SP value=21.2)
1,2-Hexanediol (SP value=27.4)

Here, EO and PO represent an ethyleneoxy group and a propyleneoxy group, respectively.

As the alkylene oxide adduct of glycerin, any of commercially available products currently marketed may be used. Examples include, as polyoxypropylated glycerin (an ether of polypropylene glycol and glycerin), SANNIX (registered trademark) GP-250 (average molecular weight of 250), SANNIX GP-400 (average molecular weight of 400), and SANNIX GP-600 (average molecular weight of 600) [all manufactured by Sanyo Chemical Industries, Ltd.], LEOCON (registered trademark) GP-250 (average molecular weight of 250), LEOCON GP-300 (average molecular weight of 300), LEOCON GP-400 (average molecular weight of 400), and LEOCON GP-700 (average molecular weight of 700) [all manufactured by LION Corporation], and polypropylenetriol glycol•triol types (average molecular weight of 300, and average molecular weight of 700) [all manufactured by Wako Pure Chemical Industries, Ltd.].

In a case in which the pigment dispersion of the invention contains a water soluble solvent, one kind of water soluble solvents may be used singly, or two or more kinds thereof may be used.

The content of the water soluble solvent (in the case of containing two or more kinds, the total content) in the pigment dispersion of the invention is preferably from 2% by mass to 30% by mass, more preferably from 5% by mass to 30% by mass, still more preferably from 8% by mass to 30% by mass, and particularly preferably from 10% by mass to 25% by mass, with respect to the whole amount of the pigment dispersion.

<Resin Particles>

It is preferable that the pigment dispersion of the invention contains at least one kind of resin particles (namely, particles formed of a resin). When resin particles are incorporated, the rub resistance of the image is further improved.

Particularly, in a case in which the pigment dispersion of the invention contains resin particles and an image is formed using this pigment dispersion and the treatment liquid described below, the rub resistance of the image is further improved.

In more detail, when the resin particles are brought into contact with the recording medium (especially, the treatment liquid or the region where the treatment liquid is dried in the recording medium), the resin particles in the pigment dispersion become unstably dispersed, aggregate, and become viscous. Accordingly, the resin particles have a function of fixing the pigment dispersion. Herewith, the rub resistance of the image is further improved. In addition, the adhesion of the pigment dispersion to the recording medium, and the like are further improved.

Note that, the resin particles are distinguished from the resin-coated pigment particles described above, in that they are particles formed of a resin.

Moreover, as described above, in a case in which the pigment dispersion of the invention contains resin particles, the improvement effects (the improvement effects on the storage stability and jetting stability) due to pigment (B) are more remarkably exhibited (namely, more drastic improvements are obtained due to pigment (B)), as compared with the case in which the pigment dispersion of the invention does not contain resin particles.

The resin particles are preferably self-dispersing polymer particles from the viewpoint of dispersibility.

The term "self-dispersing polymer particles" refers to particles formed of a self-dispersing polymer.

The self-dispersing polymer refers to a water-insoluble polymer which can get into a dispersed state in a water-based medium due to the functional groups (particularly, acidic groups or salts thereof) possessed by the polymer itself, when made into a dispersed state by a phase inversion emulsification method in the absence of a surfactant.

The scope of the term "dispersed state" used herein includes both an emulsified state (emulsion) in which a water-insoluble polymer in the liquid state is dispersed in a water-based medium, and a dispersed state (suspension) in which a water-insoluble polymer in the solid state is dispersed in a water-based medium.

The self-dispersing polymer is preferably a self-dispersing polymer that can take a dispersed state in which the water-insoluble polymer is dispersed in the solid state, from the viewpoint of fixability of the pigment dispersion to the recoding medium.

An example of the method of preparing an emulsified state or a dispersed state of the self-dispersing polymer, that is, the method of preparing an aqueous dispersion of the self-dispersing polymer, is a phase inversion emulsification method. An example of the phase inversion emulsification method is a method including: dissolving or dispersing a self-dispersing polymer in a solvent (for example, a hydrophilic organic solvent or the like); then directly pouring the obtained liquid into water without adding a surfactant; stirring and mixing the resulting liquid in a state in which the salt-forming groups (for example, acidic groups such as carboxyl groups) possessed by the self-dispersing polymer are neutralized; and removing the solvent, thereby obtaining an aqueous dispersion in the emulsified or dispersed state.

As the self-dispersing polymer particles, those selected from the self-dispersing polymer particles described in paragraphs 0090 to 0121 of JP-A No. 2010-64480, paragraphs 0130 to 0167 of JP-A No. 2011-068085, and paragraphs 0180 to 0234 of JP-A No. 2011-62998 can be used.

The resin (preferably, a self-dispersing polymer) that forms the resin particle (preferably, a self-dispersing polymer particle) is preferably a polymer (hereinafter also referred to as "polymer B") that includes:

at least one structural unit derived from an alicyclic (meth)acrylate, at least one structural unit derived from a (meth)acrylate having a chain alkyl group having from 1 to 8 carbon atoms, and at least one structural unit derived from a carboxyl group-containing monomer.

The following compounds are preferable as the alicyclic (meth)acrylate.

Examples of monocyclic (meth)acrylates, among the alicyclic (meth)acrylates, include cycloalkyl (meth)acrylates containing a cycloalkyl group having from 3 to 10 carbon atoms, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, and cyclodecyl (meth)acrylate.

Examples of bicyclic (meth)acrylates, among the alicyclic (meth)acrylates, include isobornyl (meth)acrylate and norbornyl (meth)acrylate.

Examples of tricyclic (meth)acrylates, among the alicyclic (meth)acrylates, include adamantyl (meth)acrylate, dicyclopentanyl (meth)acrylate, and dicyclopentenyloxy ethyl (meth)acrylate.

Above all, a bicyclic (meth)acrylate and a tricyclic (meth)acrylate are preferable, and isobornyl (meth)acrylate, adamantyl (meth)acrylate, and dicyclopentanyl (meth)acrylate are more preferable.

The content of the structural unit derived from an alicyclic (meth)acrylate (in the case of containing two or more kinds, the total content) with respect to the whole amount of polymer B is preferably from 20% by mass to 90% by mass, more preferably from 40% by mass to 80% by mass, still more preferably from 40% by mass to 70% by mass, and particularly preferably from 30% by mass to 70% by mass.

The (meth)acrylate having a chain alkyl group having from 1 to 8 carbon atoms is more preferably a (meth)acrylate having a chain alkyl group having from 1 to 4 carbon atoms, and particularly preferably methyl (meth)acrylate or ethyl (meth)acrylate. The term "a chain alkyl group" used herein refers to an alkyl group having a straight or branched chain.

The content of the structural unit derived from a (meth) acrylate having a chain alkyl group having from 1 to 8 carbon atoms (in the case of containing two or more kinds, the total content) with respect to the whole amount of polymer B is preferably from 10% by mass to 80% by mass, more preferably from 20% by mass to 70% by mass, and particularly preferably from 20% by mass to 60% by mass.

Specific examples of the carboxyl group-containing monomer include (meth)acrylic acid, crotonic acid, itaconic acid, maleic acid, fumaric acid, citraconic acid, and 2-methacryloyloxymethyl succinic acid, and (meth)acrylic acid is particularly preferable.

The content of the structural unit derived from a carboxyl-group containing monomer (in the case of containing two or more kinds, the total content) with respect to the whole amount of polymer B is preferably from 1% by mass to 30% by mass, more preferably from 3% by mass to 25% by mass, and particularly preferably from 5% by mass to 20% by mass.

The weight average molecular weight of the resin (preferably, a self-dispersing polymer; hereinafter the same applies.) that forms the resin particle (preferably, a self-dispersing polymer particle; hereinafter the same applies.) is preferably from 3,000 to 200,000, more preferably from 10,000 to 200,000, and still more preferably from 30,000 to 150,000. When the weight average molecular weight is 3,000 or more, the amount of water soluble components can be effectively reduced. Further, when the weight average molecular weight is 200,000 or less, the self-dispersion stability can be enhanced.

The weight average molecular weight can be measured by gel permeation chromatography (GPC) in accordance with the same method as the above-described method of measuring the weight average molecular weight of the resin dispersant.

The acid value (KOHmg/g) of the resin that forms the resin particle is preferably from 20 to 200, more preferably from 22 to 120, still more preferably from 25 to 100, and particularly preferably from 30 to 80, from the viewpoints of self-dispersibility and the like.

In the following, specific examples of the resin that forms the resin particle are shown, but it should be construed that the invention is not limited to these specific examples. Note that, the mass ratio of the copolymerization components is shown in parentheses.

Methyl methacrylate/isobornyl methacrylate/methacrylic acid copolymer (20/72/8)
Methyl methacrylate/isobornyl methacrylate/methacrylic acid copolymer (38/52/10)
Methyl methacrylate/isobornyl methacrylate/dicyclopentanyl methacrylate/methacrylic acid copolymer (20/62/10/8)
Methyl methacrylate/dicyclopentanyl methacrylate/methacrylic acid copolymer (20/72/8)

The volume average particle diameter of the resin particles is preferably in a range of from 10 nm to 400 nm, more preferably in a range of from 10 nm to 200 nm, still more preferably in a range of from 10 nm to 100 nm, and particularly preferably in a range of from 10 nm to 50 nm.

The volume average particle diameter of the resin particles can be measured by the same method as the above-described method of measuring the volume average particle diameter of the resin-coated pigment particles in the dispersed state.

In a case in which the pigment dispersion of the invention contains resin particles (preferably, self-dispersing polymer particles), the content of the resin particles (in the case of containing two or more kinds, the total content) with respect to the whole amount of the pigment dispersion is preferably from 1% by mass to 30% by mass, more preferably from 2% by mass to 20% by mass, and particularly preferably from 2% by mass to 10% by mass.

When the content is 1% by mass or higher, the rub resistance of the image is further improved.

When the content is 30% by mass or lower, the ink jettability can be further improved. Further, the content being 30% by mass or lower is also advantageous in view of suppressing the occurrence of precipitates under a low temperature environment.

<Surfactant>

The pigment dispersion of the invention can contain at least one surfactant, if necessary. The surfactant may be used, for example, as a surface tension adjusting agent.

As the surfactant, a compound having a structure including both a hydrophilic portion and a hydrophobic portion in the molecule can be effectively used, and any of an anionic surfactant, a cationic surfactant, an amphoteric surfactant, a nonionic surfactant, or a betaine surfactant may be used. Further, the resin dispersant described above may also be used as the surfactant.

From the viewpoint of suppressing interference of jetted ink droplets, a nonionic surfactant is preferable as the surfactant. Above all, an acetylene glycol derivative (acetylene glycol-based surfactant) is more preferable.

Examples of the acetylene glycol-based surfactant may include 2,4,7,9-tetramethyl-5-decyne-4,7-diol and alkylene oxide adducts of 2,4,7,9-tetramethyl-5-decyne-4,7-diol, and at least one selected from the above compounds is preferable. Examples of commercially available products of these compounds may include E series such as OLFINE (registered trademark) E1010, manufactured by Nissin Chemical Industry Co., Ltd.

As a surfactant other than the acetylene glycol-based surfactant, a fluorosurfactant is preferable. Examples of the fluorosurfactant include an anionic surfactant, a nonionic surfactant, and a betaine surfactant. Among them, an anionic surfactant is more preferable. Examples of the anionic surfactant include CAPSTONE (registered trademark) FS-63 and CAPSTONE FS-61 (all manufactured by E. I. du Pont de Nemours and Company), FTERGENT (registered trademark) 100, FTERGENT 110, and FTERGENT 150 (all manufactured by NEOS COMPANY LIMITED), and CHEMGUARD (registered trademark) S-760P (manufactured by Chemguard Inc.).

In a case in which the pigment dispersion contains a surfactant (surface tension adjusting agent), the surfactant is preferably contained in an amount such that the surface tension of the pigment dispersion can be adjusted to within the range of from 20 mN/m to 60 mN/m from the viewpoint of favorably jetting the pigment dispersion by an inkjet method, and with regard to the surface tension, the surface tension is more preferably from 20 mN/m to 45 mN/m, and still more preferably from 25 mN/m to 40 mN/m.

Here, the surface tension of the pigment dispersion refers to a value measured using an AUTOMATIC SURFACE TENSIOMETER CBVP-Z (trade name, manufactured by Kyowa Interface Science Co. Ltd.) under the condition of a liquid temperature of 25° C.

In a case in which the pigment dispersion of the invention contains a surfactant, the specific amount of the surfactant is not particularly limited, but the content of the surfactant is preferably 0.1% by mass or higher, more preferably from 0.1% by mass to 10% by mass, and still more preferably from 0.2% by mass to 3% by mass, with respect to the whole amount of the pigment dispersion.

<Urea>

The pigment dispersion of the invention can contain urea.

Since urea has a high moisturizing function, urea can efficiently suppress undesirable drying and coagulation of ink, as a solid wetting agent.

In a case in which the pigment dispersion of the invention contains urea, the content of urea with respect to the whole amount of the pigment dispersion is preferably from 1% by mass to 20% by mass, more preferably from 1% by mass to 15% by mass, and still more preferably from 3% by mass to 10% by mass.

<Additional Components>

The pigment dispersion of the invention may contain one or more additional components in addition to the above components, if necessary.

Examples of the additional components include known additives such as a solid wetting agent other than urea, colloidal silica, an antifoaming agent, an inorganic salt, an anti-fading agent, an emulsion stabilizer, a penetration enhancing agent, an ultraviolet absorbent, an antiseptic agent, a mildew-proofing agent, a pH adjusting agent, a viscosity adjusting agent, an antirust agent, or a chelating agent.

The pigment dispersion of the invention may be an actinic energy ray (for example, ultraviolet ray) curable type pigment dispersion containing at least one polymerizable compound.

In this case, it is preferable that the pigment dispersion (in the case of using the treatment liquid described below, at least one of the pigment dispersion or the treatment liquid) further contains a polymerization initiator.

Examples of the polymerizable compound include polymerizable compounds (for example, a (meth)acrylamide compound having a functionality of two or higher) described in paragraphs 0128 to 0144 of JP-A No. 2011-184628, paragraphs 0019 to 0034 of JP-A No. 2011-178896, paragraphs 0065 to 0086 of JP-A No. 2015-25076, and the like.

Examples of the polymerization initiator include known polymerization initiators described in paragraphs 0186 to 0190 of JP-A No. 2011-184628, paragraphs 0126 to 0130 of JP-A No. 2011-178896, and paragraphs 0041 to 0064 of JP-A No. 2015-25076.

<Preferable Physical Properties of Pigment Dispersion>

There is no particular limitation on the physical properties of the pigment dispersion of the invention, but it is preferable that the pigment dispersion of the invention has the physical properties described below.

The pH of the pigment dispersion of the invention at 25° C. (±1° C.) is preferably 7.5 or higher, from the viewpoints of the aggregation speed and the dispersion stability of the composition.

The pH (at 25° C.±1° C.) of the pigment dispersion of the invention is preferably from 7.5 to 13, and more preferably from 7.5 to 10.

The viscosity of the pigment dispersion of the invention is preferably in a range of from 0.5 mPa·s to 10 mPa·s, and more preferably in a range of from 1 mPa·s to 7 mPa·s, from the viewpoint of the aggregation speed.

The viscosity is measured using a VISCOMETER TV-22 (trade name, manufactured by TOKI SANGYO CO., LTD.) under the condition of 30° C.

The surface tension of the pigment dispersion of the invention at 25° C. (±1° C.) is preferably 60 mN/m or less, more preferably from 20 mN/m to 50 mN/m, and still more preferably from 25 mN/m to 45 mN/m. When the surface tension of the pigment dispersion is within the range, it is advantageous in terms of suppression of occurrence of curling in the recording medium. The surface tension is measured using an AUTOMATIC SURFACE TENSIOMETER CBVP-Z (trade name, manufactured by Kyowa Interface Science Co. Ltd.), in accordance with a plate method.

[Method of Producing Pigment Dispersion for Ink Jetting]

The method of producing the above-described pigment dispersion for ink jetting of the invention is preferably a production method according to the embodiment described below.

Namely, the method of producing the pigment dispersion for ink jetting according to the embodiment includes a process (hereinafter also referred to as "first process") of obtaining a pigment dispersion for ink jetting by mixing at least pigment (A), pigment (B), and water, and subjecting the resulting mixture to a dispersion treatment.

By using the production method according to the embodiment, the dispersibility of pigment (A) is excellent, as compared with the method of obtaining a pigment dispersion by separately producing a dispersion, in which pigment (A) is dispersed in water, and a dispersion, in which pigment (B) is dispersed in water, and then mixing these dispersions. Thus, a pigment dispersion having excellent storage stability and excellent jetting stability can be obtained.

The pigment (A) and pigment (B) are as described above, and preferable ranges thereof are also as described above.

A preferable mode of the first process is a mode including a process of obtaining a pigment mixture by mixing pigment (A) and pigment (B), and a process of obtaining a pigment dispersion for ink jetting by mixing at least the pigment mixture and water, and subjecting the resulting mixture to a dispersion treatment.

According to this mode, dispersibility of pigment (A) is particularly excellent, as compared with the method of obtaining a pigment dispersion by separately producing a dispersion, in which pigment (A) is dispersed in water, and a dispersion, in which pigment (B) is dispersed in water, and then mixing these dispersions. Thus, a pigment dispersion having particularly excellent storage stability and particularly excellent jetting stability can be obtained.

However, the mode of the first process is not limited to the above preferable mode, and may be other mode, for example, a mode in which pigment (A) and pigment (B) are added to water at the same time or separately, and then subjecting the resulting mixture to a dispersion treatment, or the like.

The mixing and dispersion treatment in the first process can be carried out according to a known method.

The mixing and dispersion treatment in the first process can be performed by using, for example, a twin roll mill, a triple roll mill, a ball mill, a bead mill, a trommel, a disper, a kneader, a co-kneader, a homogenizer, a blender, a single-screw extruder, a twin-screw extruder, or the like.

For the details on the mixing and dispersion treatment, description in "Paint Flow and Pigment Dispersion", written by T. C. Patton (published by John Wiley and Sons, 1964) and the like can be referred to.

In the first process, at least pigment (A), pigment (B), and water are mixed; however, the substances to be mixed are not limited only to the pigment (A), pigment (B), and water. In the first process, an additional component may be mixed, in addition to pigment (A), pigment (B), and water.

The additional component is preferably a dispersant (preferably, a resin dispersant). A preferable range of the dispersant is as described above.

Further, the production method according to the embodiment may have a process other than the first process.

An example of the process other than the first process is a second process of further adding one or more components to the pigment dispersion (pigment dispersion for ink jetting) obtained in the first process.

Examples of the component to be added in the second process include at least one of the components (for example, a water soluble solvent, a surfactant, urea, resin particles, or the like) which may be contained in the pigment dispersion described above. Further, water is also described as the component to be added in the second process.

[Ink Set]

The ink set according to the embodiment includes an ink that is the above-described pigment dispersion for ink jetting of the invention, and a treatment liquid containing an acid (hereinafter also referred to as "acidic compound") that aggregates components contained in the ink.

By using the ink set according to the embodiment, an image having excellent rub resistance can be formed.

<Treatment Liquid>

The treatment liquid contains at least one acidic compound.

(Acidic Compound)

Examples of the acidic compound include acidic substances capable of lowering the pH of the ink.

As the acidic compound, either of an organic acidic compound or an inorganic acidic compound may be used. Alternatively, at least one organic acidic compound and at least one inorganic acidic compound may be used in combination.

—Organic Acidic Compound—

Examples of the organic acidic compound include organic compounds having an acidic group.

Examples of the acidic group may include a phosphoric acid group, a phosphonic acid group, a phosphinic acid group, a sulfuric acid group, a sulfonic acid group, a sulfinic acid group, and a carboxyl group. From the viewpoint of the aggregation speed of the ink, the acidic group in the embodiment is preferably a phosphoric acid group or a carboxyl group, and more preferably a carboxyl group.

Preferable examples of the organic compound having a carboxyl group (organic carboxylic acid) include polyacrylic acid, acetic acid, glycolic acid, malonic acid, malic acid (preferably, DL-malic acid), maleic acid, ascorbic acid, succinic acid, glutaric acid, fumaric acid, citric acid, tartaric acid, phthalic acid, 4-methylphthalic acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, derivatives of these compounds, and salts thereof (for example, polyvalent metal salts). These compounds may be used singly or in combination of two or more thereof.

From the viewpoint of the aggregation speed of the ink, the organic carboxylic acid is preferably a carboxylic acid having a valency of two or more (hereinafter, also referred to as "polyvalent carboxylic acid"), more preferably malonic acid, malic acid, maleic acid, succinic acid, glutaric acid, fumaric acid, tartaric acid, 4-methylphthalic acid, or citric acid, and still more preferably malonic acid, malic acid, tartaric acid, or citric acid.

It is preferable that the organic acidic compound has a low pKa.

Herewith, when an organic acidic compound having a lower pKa is brought into contact with particles such as pigment particles or polymer particles in the ink, in which the particles are dispersion stabilized due to a weakly acidic functional group such as a carboxyl group, the surface electric charge of the particles is further decreased, and thus, the dispersion stability can be lowered.

It is preferable that the organic acidic compound incorporated in the treatment liquid has a low pKa, a high solubility with respect to water, and a valency of two or more. It is more preferable that the organic acidic compound is a bivalent or trivalent acidic substance having a high buffer capacity in the region of pH that is lower than the pKa of the functional group (for example, a carboxyl group or the like) which provides dispersion stability of the particles in the ink.

—Inorganic Acidic Compound—

Examples of the inorganic acidic compound include phosphoric acid, nitric acid, nitrous acid, sulfuric acid, hydrochloric acid, and the like, while the scope of the invention is not limited thereto. From the viewpoints of suppressing the occurrence of unevenness in glossiness at the image area, and the aggregation speed of the ink, the inorganic acidic compound is most preferably phosphoric acid.

The solubility (at 25° C.) of phosphoric acid in the form of a calcium salt (calcium phosphate) with respect to water is low, being 0.0018 g/100 g of water. Accordingly, when the inorganic acidic compound contained in the treatment liquid is phosphoric acid, the calcium salt is not dissolved and is fixed, and thus, the effect on suppressing the occurrence of unevenness in glossiness, which occurs at the surface of the image area, is excellent.

Particularly, in a case in which a recording medium having a coat layer that contains calcium carbonate is used as the recording medium, phosphoric acid is advantageous as the inorganic acidic compound incorporated in the treatment liquid.

The total content of the acidic compounds contained in the treatment liquid is not particularly limited, but from the viewpoint of the aggregation speed of the ink, the total amount of the acidic compounds is preferably from 5% by mass to 40% by mass, and more preferably from 10% by mass to 30% by mass, with respect to the whole amount of the treatment liquid.

In the case of using an organic acidic compound and an inorganic acidic compound in combination as the acidic compounds, the content ratio of the organic acidic compound and the inorganic acidic compound is such that the content of the inorganic acidic compound relative to the content of the organic acidic compound is preferably from 5 mol % to 50 mol %, more preferably from 10 mol % to 40 mol %, and still more preferably from 15 mol % to 35 mol %, from the viewpoints of the aggregation speed and suppression of unevenness in glossiness.

The treatment liquid may contain, other than the acidic compound, an additional aggregating component such as a polyvalent metal salt or a cationic polymer.

Regarding the polyvalent metal salt or cationic polymer, a polyvalent metal salt or cationic polymer described, for example, in paragraphs 0155 to 0156 of JP-A No. 2011-042150 can be used.

(Water Soluble Polymer Compound)

It is preferable that the treatment liquid contains at least one water soluble polymer compound.

The water soluble polymer compound is not particularly limited, and a known water soluble polymer, such as polyvinyl alcohol, polyacrylamide, polyvinyl pyrrolidone, or polyethylene glycol, can be used.

Further, the specific polymer compound described below and the water soluble polymer compound described in paragraphs 0026 to 0080 of JP-A No. 2013-001854 are also preferable as the water soluble polymer compound.

The weight average molecular weight of the water soluble polymer compound is not particularly limited but, for example, the weight average molecular weight is from 10,000 to 100,000, preferably from 20,000 to 80,000, and more preferably from 30,000 to 80,000.

Further, the content of the water soluble polymer compound in the treatment liquid is not particularly limited, but the content of the water soluble polymer compound is preferably from 0.1% by mass to 10% by mass, more preferably from 0.1% by mass to 4% by mass, still more preferably from 0.1% by mass to 2% by mass, and yet still more preferably from 0.1% by mass to 1% by mass, with respect to the whole amount of the treatment liquid.

When the content is 0.1% by mass or higher, spreading of ink droplets can be further promoted, and when the content is 10% by mass or lower, thickening of the treatment liquid can be further suppressed. Moreover, when the content is 10% by mass or lower, unevenness in coating of the treatment liquid caused by bubbles in the treatment liquid can be further suppressed.

The water soluble polymer compound is preferably a polymer compound (hereinafter also referred to as "specific polymer compound".) containing a hydrophilic structural unit having an ionic group (preferably, an anionic group). Herewith, spreading of ink droplets applied onto the recording medium can be further promoted, and roughness of the image can be further suppressed.

Examples of the ionic group in the specific polymer compound include a carboxyl group, a sulfonic acid group, a phosphoric acid group, a boric acid group, an amino group, an ammonium group, and salts thereof. Among them, a carboxyl group, a sulfonic acid group, a phosphoric acid group, and salts thereof are preferable, a carboxyl group, a sulfonic acid group, and salts thereof are more preferable, and a sulfonic acid group and a salt thereof are still more preferable.

The hydrophilic structural unit having an ionic group (preferably, an anionic group) is preferably a structural unit derived from a (meth)acrylamide compound having an ionic group (preferably, an anionic group).

The content of the hydrophilic structural unit having an ionic group (preferably, an anionic group) in the water soluble polymer compound can be set, for example, from 10% by mass to 100% by mass of the whole mass of the water soluble polymer compound, and is preferably from 10% by mass to 90% by mass, more preferably from 10% by mass to 70% by mass, still more preferably from 10% by mass to 50% by mass, and yet still more preferably from 20% by mass to 40% by mass.

It is more preferable that the specific polymer compound contains at least one hydrophilic structural unit having an ionic group (preferably an anionic group, and particularly preferably a sulfonic acid group) as described above and at least one hydrophobic structural unit. By incorporating a hydrophobic structural unit, the specific polymer compound more easily exists at the surface of the treatment liquid, and therefore, spreading of ink droplets applied onto the recording medium can be further promoted, and the roughness of the image can be further suppressed.

The hydrophobic structural unit is preferably a structural unit derived from a (meth)acrylic acid ester (preferably, a $C_{1-4}$ alkyl ester of (meth)acrylic acid).

The content of the hydrophobic structural unit in the specific polymer compound can be set, for example, from 10% by mass to 90% by mass of the whole mass of the specific polymer compound, and is preferably from 30% by mass to 90% by mass, more preferably from 50% by mass to 90% by mass, and still more preferably from 60% by mass to 80% by mass.

(Water)

It is preferable that the treatment liquid contains water.

The content of water is preferably from 50% by mass to 90% by mass, and more preferably from 60% by mass to 80% by mass, with respect to the whole mass of the treatment liquid.

(Water Soluble Solvent)

It is preferable that the treatment liquid contains at least one kind of water soluble solvent.

As the water soluble solvent, specifically, a water soluble solvent that can be incorporated in the pigment dispersion of the invention can also be used in the treatment liquid.

Above all, from the viewpoint of suppression of curling, the water soluble solvent is preferably a polyalkylene glycol or a derivative thereof, and more preferably at least one selected from the group consisting of diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol.

The content of the water soluble solvent in the treatment liquid is preferably from 3% by mass to 20% by mass, and more preferably from 5% by mass to 15% by mass, with respect to the whole treatment liquid, from the viewpoints of coating property and the like.

—Surfactant—

The treatment liquid may contain at least one surfactant.

The surfactant can be used as a surface tension adjusting agent. Examples of the surface tension adjusting agent include a nonionic surfactant, a cationic surfactant, an anionic surfactant, and a betaine surfactant. Among them, a nonionic surfactant or an anionic surfactant is preferable, from the viewpoint of the aggregation speed of the ink.

Examples of the surfactant further include compounds described, as the surfactant, on pages 37 to 38 of JP-A No. S59-157636 and in Research Disclosure No. 308119 (1989). Moreover, examples of the surfactant further include fluoro (fluoroalkyl-based) surfactants and silicone-based surfactants described in JP-A No. 2003-322926, JP-A No. 2004-325707, and JP-A No. 2004-309806.

The content of the surfactant in the treatment liquid is not particularly limited, but the content of the surfactant is preferably such a content that adjusts the surface tension of the treatment liquid to be 50 mN/m or less, more preferably a content that adjusts the surface tension of the treatment liquid to be from 20 mN/m to 50 mN/m, and still more preferably a content that adjusts the surface tension of the treatment liquid to be from 30 mN/m to 45 mN/m.

(Additional Additives)

The treatment liquid may contain one or more additional components other than the above components, if necessary.

Examples of the additional components that can be incorporated in the treatment liquid are the same as the above-described additional components that can be incorporated in the pigment dispersion.

(Physical Properties of Treatment Liquid)

The pH of the treatment liquid at 25° C. (±1° C.) is preferably from 0.1 to 0.5, from the viewpoint of the aggregation speed of the ink.

When the pH of the treatment liquid is 0.1 or higher, the roughness of the recording medium is further reduced, and adhesion of the image area is further enhanced.

When the pH of the treatment liquid is 0.5 or lower, the aggregation speed is further increased, coalescence of dots of ink (ink dots) on the recording medium is further suppressed, and the roughness of the image is further reduced.

The pH (at 25° C.±1° C.) of the treatment liquid is more preferably from 0.2 to 0.4.

The viscosity of the treatment liquid is preferably in a range of from 0.5 mPa·s to 10 mPa·s, and more preferably in a range of from 1 mPa·s to 5 mPa·s, from the viewpoint of the aggregation speed of the ink. The viscosity is measured using a VISCOMETER TV-22 (trade name, manufactured by TOKI SANGYO CO., LTD.) under the condition of 25° C.

The surface tension of the treatment liquid at 25° C. (±1° C.) is preferably 60 mN/m or less, more preferably from 20 mN/m to 50 mN/m, and still more preferably from 30 mN/m to 45 mN/m. When the surface tension of the treatment liquid is within the range, it is advantageous in terms of prevention of occurrence of curling in the recording medium. The surface tension of the treatment liquid is measured using an AUTOMATIC SURFACE TENSIOMETER CBVP-Z (trade name, manufactured by Kyowa Interface Science Co. Ltd.), in accordance with a plate method.

[Image Forming Method]

The image forming method according to the embodiment includes an ink application process of applying, onto a recording medium, an ink that is the above-described pigment dispersion for ink jetting of the invention by an inkjet method, thereby forming an image, and a treatment liquid application process of applying, onto the recording medium, a treatment liquid containing an acid that aggregates components contained in the ink.

By using the image forming method according to the embodiment, an image having excellent rub resistance can be formed.

As the recording medium, a commonly marketed product can be used. Examples thereof include wood free paper (A) such as "OK PRINCE JOSHITSU" (trade name) manufactured by Oji Paper Co., Ltd., "SHIRAOI (registered trademark)" manufactured by Nippon Paper Industries Co., Ltd., or "New NPI (registered trademark) JOSHITSU" manufactured by Nippon Paper Industries Co., Ltd.; ultra light weight coated paper such as "OK EVER LIGHT (registered trademark) COAT" manufactured by Oji Paper Co., Ltd. or "AURORA S" (trade name) manufactured by Nippon Paper Industries Co., Ltd.; lightweight coated paper (A3) such as "OK COAT L" (trade name) manufactured by Oji Paper Co., Ltd. or "AURORA L" (trade name) manufactured by Nippon Paper Industries Co., Ltd.; coated paper (A2, B2) such as "OK TOP COAT (registered trademark) PLUS" manufactured by Oji Paper Co., Ltd. or "AURORA COAT" (trade name) manufactured by Nippon Paper Industries Co., Ltd.; art paper (A1) such as "OK KINFUJI (registered trademark) PLUS" manufactured by Oji Paper Co., Ltd. or "TOKUBISHI ART" (trade name) manufactured by Mitsubishi Paper Mills Ltd.; matte paper (A2) such as "NEW AGE (registered trademark)" or "OK TOP COAT (registered trademark) MAT", all manufactured by Oji Paper Co., Ltd., "U-LIGHT (registered trademark)" manufactured by Nippon Paper Industries Co., Ltd., "NEW V MAT" (trade name) manufactured by Mitsubishi Paper Mills Ltd., or "RAICHO MAT COAT N" (trade name) manufactured by Chuetsu Pulp & Paper Co., Ltd.; cardboard such as "AIBEST (registered trademark)" manufactured by Nippon Daishowa Paperboard Co., Ltd., "PERFECT W" (trade name) manufactured by Hokuetsu Kishu Paper Co., Ltd., "BUON IVORY (registered trademark) PLUS" manufactured by Oji Paper Co., Ltd., "OK PLAU" (trade name) manufactured by Oji Paper Co., Ltd., "F1 CARD" (trade name) manufactured by Nippon Daishowa Paperboard Co., Ltd., "NO BACK W" (trade name) manufactured by Hokuetsu Kishu Paper Co., Ltd., "HIGH LUCKY (registered trademark)" manufactured by Hokuetsu Kishu Paper Co., Ltd., "OK L CARD" (trade name) manufactured by Oji Paper Co., Ltd., "PEARL DELUX (registered trademark)" manufactured by Mitsubishi Paper Mills Ltd., "PC GREEN 100" (trade name) manufactured by Oji Paper Co., Ltd., "NEW DV" (trade name) manufactured by Hokuetsu Kishu Paper Co., Ltd., "MARI COAT (registered trademark)" manufactured by Hokuetsu Kishu Paper Co., Ltd., or "UF COAT" (trade name) manufactured by Oji Paper Co., Ltd.; and the like.

Further, it is also possible to use various inkjet recording papers exclusively for photos, as the recording medium.

<Ink Application Process>

The ink application process is a process of applying ink (the above-described pigment dispersion of the invention) onto a recording medium by an inkjet method.

In this process, the ink can be selectively applied onto the recording medium, and thus, a desired visible image can be formed.

In image formation by an inkjet method, ink is jetted onto a desired recording medium by supplying energy, and a colored image is formed. In the embodiment, the method described in paragraphs 0093 to 0105 of JP-A No. 2003-306623 can be applied as a preferable inkjet method.

The inkjet method is not particularly limited and may be of any known system, for example, a charge control system in which an ink is jetted by utilizing an electrostatic attraction force; a drop on demand system (pressure pulse system) in which a vibration pressure of a piezo element is utilized; an acoustic inkjet system in which an electric signal is converted into an acoustic beam and an ink is irradiated with the acoustic beam so that the ink is jetted by utilizing the radiation pressure; a thermal inkjet (BUBBLE JET (registered trademark)) system in which an ink is heated to form bubbles and the resulting pressure is utilized; or the like. As the inkjet method, particularly, the inkjet method described in JP-A No. S54-59936, in which thermal energy is applied to an ink, the ink volume changes drastically, and by using the power caused by this change of state, the ink is jetted from the nozzles, can be effectively utilized.

Examples of the inkjet head include a shuttle system in which a short serial head is used and recording is performed while allowing the head to scan in the width direction of the recording medium, and a line system using a line head in which recording elements are arranged corresponding to the whole region of one side of the recording medium. In the line system, an image can be recorded over the whole surface of the recording medium by allowing the recording medium to be scanned in the direction perpendicular to the arranging direction of the recording elements, in which a transportation system such as a carriage by which the short head moves for scanning is not necessary. Further, in the line system, since complicated scanning control for the movement of the carriage and the recording medium is not necessary and only the recording medium moves, a higher recording speed can be realized as compared with the shuttle system. The image forming method according to the embodiment is applicable to any one of these systems; however, in a case in which the image forming method according to the embodiment is applied to the line system in which dummy jetting is not generally carried out, the effects on improvements in jetting accuracy and rub resistance of the image are great.

The amount of droplet of the ink jetted from the inkjet head is preferably from 1 pL (picoliter) to 10 pL, and more preferably from 1.5 pL to 6 pL, from the viewpoint of obtaining high-definition images. Further, from the viewpoints of suppression of image unevenness and improvement in continuity in continuous tone, it is effective to jet ink droplets with different droplet amounts in combination, and even in such a case, the embodiment can be preferably employed.

<Treatment Liquid Application Process>

The image forming method according to the embodiment includes a treatment liquid application process of applying the treatment liquid to the recording medium.

In the treatment liquid application process, the treatment liquid containing an acidic compound that aggregates components contained in the ink is applied onto the recording medium, whereby the treatment liquid is brought into contact with the ink to form an image. In this case, dispersed particles such as resin particles, which are contained in the ink, aggregate, whereby the image is fixed onto the recording medium.

Preferable modes of the treatment liquid are as described above.

Application of the treatment liquid can be performed by applying a known method, such a coating method, an inkjet method, or an immersion method. The coating method can be performed by a known coating method using a bar coater, an extrusion die coater, an air doctor coater, a blade coater, a rod coater, a knife coater, a squeeze coater, a reverse roll coater, or the like. Details of the inkjet method are as described above.

The treatment liquid application process may be provided either before or after the ink application process.

In the embodiment, a mode in which the ink application process is provided after the treatment liquid application process is preferable.

Specifically, a mode is preferable, in which, before applying an ink onto the recording medium, the treatment liquid for aggregating components (the above-described dispersed particles) contained in the ink is applied onto the recording medium in advance, and then the ink is applied so as to be in contact with the treatment liquid that has been applied onto the recording medium, thereby forming an image. Herewith, inkjet recording speed may be increased, and even when high speed recording is performed, an image having high density and high resolution can be obtained.

The application amount of the treatment liquid is not particularly limited, so long as the treatment liquid is capable of aggregating the ink. The application amount of the treatment liquid is preferably such that the amount of the aggregating component applied is 0.1 g/m$^2$ or more. Above all, the application amount of the treatment liquid is preferably such that the amount of the aggregating component applied is from 0.2 g/m$^2$ to 2.0 g/m$^2$. When the amount of the aggregating component applied is 0.1 g/m$^2$ or more, favorable high-speed aggregation properties may be maintained according to the various forms of usage of the ink. Further, the amount of the aggregating component applied is preferably 2.0 g/m$^2$ or less, because, in such a case, the treatment liquid may not exert influence (change in gloss or the like) on the surface property of the recording medium, onto which the treatment liquid is applied.

Moreover, in the embodiment, it is preferable that the ink application process is provided after the treatment liquid application process, and that drying (preferably heat drying) of the treatment liquid on the recording medium is conducted after the application of the treatment liquid onto the recording medium but before the application of the ink. Herewith, the effects on prevention of bleeding and improvement in ink coloring properties are obtained and, as a result, a visible image having a favorable color density and a favorable hue can be recorded. Preferable modes of the means and method for heat drying of the treatment liquid are the same as the preferable modes of the means and method for heat drying of the image in the drying process described below.

<Drying Process>

The image forming method according to the embodiment preferably has a drying process of drying the image after the ink application process and the treatment liquid application process.

Concerning the drying, it is preferable to perform heat drying.

Examples of a means for carrying out heat drying of the image include known heating means such as a heater, a known air blow means such as a dryer, and a means using these means in combination.

Examples of a method for carrying out heat drying of the image include a method of applying heat, by using a heater or the like, to the opposite side of the recording medium from the surface at which an image is formed, a method of blowing warm air or hot air to the surface of the recording medium at which an image is formed, a method of applying heat, by using an infrared heater, to the surface of the recording medium at which an image is formed or to the opposite side of the recording medium from the surface at which an image is formed, and a method using two or more of these methods in combination.

The heating temperature at the time of heat drying of the image is preferably 60° C. or higher, more preferably 65° C. or higher, and particularly preferably 70° C. or higher.

There is no particular limitation on the upper limit of the heating temperature, but the upper limit is, for example, 100° C., and is preferably 90° C.

The time of heat drying of the image is not particularly limited, but is preferably from 3 seconds to 60 seconds, more preferably from 5 seconds to 30 seconds, and particularly preferably from 5 seconds to 20 seconds.

<Inkjet Recording Apparatus>

There is no particular limitation as to the image forming apparatus usable for the image forming method according to the embodiment, and a known image forming apparatus described in JP-A No. 2010-83021, JP-A No. 2009-234221, JP-A No. H10-175315, and the like can be used.

Next, an example of the inkjet recording apparatus suitably used for carrying out the image forming method according to the embodiment is specifically explained with reference to FIG. 1.

FIG. 1 is a schematic configuration diagram showing an example of the structure of the entire inkjet recording apparatus.

As shown in FIG. 1, the inkjet recording apparatus includes: a treatment liquid application section 12 equipped with an anilox roller 20 and a coating roller 22 that contacts the anilox roller, as the roller materials with which the treatment liquid is coated; a treatment liquid drying zone 13 equipped with a heating means (not shown) that dries the applied treatment liquid; an ink jetting section 14 that jets various inks; and an ink drying zone 15 at which the jetted ink is dried, in this order toward the conveyance direction (the direction of the arrow shown in the FIGURE) of the recording medium.

The recording medium that has been supplied to this inkjet recording apparatus is conveyed by conveyor rollers from a paper feed section, which feeds the recording medium from a case in which the recording media are loaded, to the treatment liquid application section 12, then to the treatment liquid drying zone 13, then to the ink jetting section 14, and then to the ink drying zone 15, and then accumulated in an accumulation section. The conveyance may also be conducted by a method other than the method using conveyor rollers and, for example, a drum conveyance system using a drum-shaped member, a belt conveyance system, a stage conveyance system using a stage, or the like may be adopted.

Among the plural conveyor rollers arranged, at least one roller may be a drive roller to which the motive power generated by a motor (not shown) is transmitted. By rotating the drive roller at a constant rate using the motor, the recording medium is conveyed in a predetermined direction at a predetermined conveyance amount.

The treatment liquid application section 12 is provided with an anilox roller 20 that is positioned such that a part of the roller is dipped in a storage plate in which the treatment liquid is stored, and a coating roller 22 that contacts the anilox roller 20. The anilox roller 20 is a roller material that supplies a predetermined amount of treatment liquid to the coating roller 22 that is positioned so as to face the recording surface of the recording medium. By using the coating roller 22, to which an appropriate amount of treatment liquid is supplied from the anilox roller 20, the treatment liquid is uniformly coated onto the recording medium.

The coating roller 22 is configured to form a pair with an opposing roller 24 so as to be capable of conveying the recording medium, and the recording medium is conveyed to the treatment liquid drying zone 13 while passing through between the coating roller 22 and the opposing roller 24.

The treatment liquid drying zone 13 is positioned at the downstream side of the treatment liquid application section 12 in the conveyance direction of the recording medium. The treatment liquid drying zone 13 may include a known heating means such as a heater, an air blowing means utilizing air blow such as a dryer, or a means using these means in combination. Examples of the heating means include a method of disposing a heat-generating member, such as a heater, at the opposite side of the recording medium from the surface applied with the treatment liquid (for example, in a case in which the recording medium is conveyed automatically, the heat-generating member is disposed below the conveyance system that conveys the recording medium placed thereon), a method of blowing warm air or hot air to the surface of the recording medium, to which the treatment liquid is applied, and a method of heating using an infrared heater. Heating may be conducted by using two or more of these methods in combination.

Since the surface temperature of the recording medium varies depending on the type (material, thickness, or the like) of the recording medium, the environmental temperature, and the like, it is preferable to apply the treatment liquid while controlling the temperature by providing a measurement section that measures the surface temperature of the recording medium and a control system that feedbacks the value of the surface temperature of the recording medium which has been measured at the measurement section to a heating control section. The measurement section that measures the surface temperature of the recording medium is preferably a contact type or non-contact type thermometer.

The solvent may be removed by using a solvent-removing roller or the like. Alternatively, a method in which excess solvent is removed from the recording medium by using an air knife may also be used.

The ink jetting section 14 is positioned at the downstream side of the treatment liquid drying zone 13 in the conveyance direction of the recording medium. The ink jetting section 14 includes recording heads (ink jetting heads) 30K, 30C, 30M, 30Y, 30A, and 30B, which are connected to ink storage sections that store inks of black (K), cyan (C), magenta (M), yellow (Y), a special color ink (A), and a special color ink (B), respectively. Each ink storage section, not shown in the FIGURE, stores an ink containing a pigment of a corresponding hue, resin particles, a water soluble solvent, and water, and the ink is supplied to the corresponding head among the ink jetting heads 30K, 30C, 30M, 30Y, 30A, and 30B, as needed, when recording an image.

In the embodiment, the ink (orange ink) that is the pigment dispersion of the invention is used as one of the special color ink (A) or the special color ink (B). Namely, the ink that is the pigment dispersion of the invention is jetted from any one of the ink jetting heads 30A and 30B.

In the inkjet recording apparatus according to the embodiment, the other one of the ink jetting heads 30A and 30B may be omitted. Another special color ink jetting head may be provided, in addition to the ink jetting heads 30A and 30B.

Each of the ink jetting heads 30K, 30C, 30M, 30Y, 30A, and 30B jets an ink in a manner corresponding to the image, through the jetting nozzles that are arranged so as to face the recording surface of the recording medium. In this way, inks are applied onto the recording surface of the recording medium, thereby recording a color image.

Each of the ink jetting heads 30K, 30C, 30M, 30Y, 30A, and 30B is a full line head, in which a number of jetting ports (nozzles) are arranged over the maximum recording width of the image to be recorded on the recording medium (maximum recording width). Thus, an image can be recorded at a higher speed on the recording medium, as compared with the serial type in which recording is performed while allowing a short shuttle head to reciprocatingly scan in the width direction of the recording medium (in the direction perpendicular to the conveying direction in the recording medium conveying face). In the embodiment, any of recording with a serial type or recording with a system capable of recording at a relatively higher speed, for example, a single path system that forms one line with one scan may be adopted; however, according to the image recording method according to the embodiment, also by a single path system, a high quality image with high reproducibility can be obtained.

Here, the ink jetting heads 30K, 30C, 30M, 30Y, 30A, and 30B all have the same structure.

It is preferable that the application amount of the treatment liquid and the application amount of the ink are adjusted in accordance with the necessity. For example, according to the type of the recording medium, the application amount of the treatment liquid may be changed in order to, for example, adjust the physical properties such as viscoelasticity of the aggregates formed when mixing the treatment liquid and the ink.

The ink drying zone 15 is positioned at the downstream side of the ink jetting section 14 in the conveyance direction of the recording medium. The ink drying zone 15 may have the same structure as the structure of the treatment liquid drying zone 13.

The inkjet recording apparatus may further include a heating means that performs heat treatment with respect to the recording medium, at the conveyance path from the paper feed section to the accumulation section. For example, by providing a heating means at a desired position, for example, at a position on the upstream side of the treatment liquid drying zone 13, at a position between the ink jetting section 14 and the ink drying zone 15, or the like, the temperature of the recording medium can be elevated to a desired temperature. Thus, it is possible to effectively perform drying and fixing.

EXAMPLES

Hereinafter, the present invention is specifically described with reference to Examples; however, the invention is by no means limited to the following Examples. Unless otherwise specifically stated, the "parts" and "%" are based on mass.

In the following Examples, the "dispersion liquid of resin-coated pigment particles" and the "ink" are each a mode of the "pigment dispersion".

Example 1

<Synthesis of Water Soluble Resin Dispersant P-1>

Methacrylic acid (172 parts), benzyl methacrylate (828 parts), and isopropanol (375 parts) were mixed, to prepare a monomer supplying composition. Further, 2,2-azobis(2-methylbutylonitrile) (22.05 parts) and isopropanol (187.5 parts) were mixed, to prepare an initiator supplying composition.

Subsequently, isopropanol (187.5 parts) was heated to 80° C. under nitrogen atmosphere, and a mixture of the above monomer supplying composition and the above initiator supplying composition was added thereto dropwise over two hours. After the completion of the dropwise addition, the resulting mixture was kept at 80° C. for an additional 4 hours, and then cooled to 25° C.

After cooling, the solvent was removed under reduced pressure, thereby obtaining water soluble resin dispersant P-1 having a weight average molecular weight of about 30,000 and an acid value of 112 mgKOH/g.

<Preparation of Dispersion Liquid of Resin-Coated Pigment Particles>

To the water soluble resin dispersant P-1 (150 parts) obtained as described above, an aqueous solution of potassium hydroxide was added, whereby an aqueous solution of a water soluble resin dispersant, the aqueous solution having a pH of 9 and a concentration of the water soluble resin dispersant of 25% by mass, was obtained.

Further, the pigment (A) and pigment (B) shown in Table 1 were mixed at a mass ratio [pigment (A)/pigment (B)] shown in Table 1, to obtain a pigment mixture.

The aqueous solution (97.2 parts) of a water soluble resin dispersant, the pigment mixture (48.6 parts), water (78.2 parts), and dipropylene glycol (100 parts) were mixed. Then, the resulting mixture was subjected to dispersion treatment using a bead mill (bead diameter of 0.1 mmφ, zirconia beads), thereby obtaining a dispersion liquid of resin-coated pigment particles (pigment dispersion), in which the sum of the content of pigment (A) and the content of pigment (B) was 12% by mass with respect to the whole amount of the dispersion liquid.

The volume average particle diameter of the resin-coated pigment particles in the dispersion liquid thus obtained was measured using a NANOTRAC particle size distribution analyzer UPA-EX150 (trade name, manufactured by Nikkiso Co., Ltd.), in accordance with a dynamic light scattering method. Results are shown in Table 1.

<Preparation of Ink>

The following components of the following composition were mixed, thereby obtaining an ink (in detail, an orange ink).

Note that, the ink thus obtained is also a mode of a pigment dispersion.

—Composition of Ink (Orange Ink)—

| | |
|---|---|
| Dispersion liquid of resin-coated pigment particles obtained as described above | 30% by mass |
| SANNIX GP-250 (trade name; water soluble solvent) | 10.0% by mass |
| PG (propylene glycol; water soluble solvent) | 10.0% by mass |
| OLFINE E1010 (trade name, manufactured by Nissin Chemical Industry Co., Ltd.; surfactant) | 1.0% by mass |
| Urea | 5.0% by mass |
| Ion exchanged water | remaining amount that provides a total amount of 100% by mass |

<Evaluation>

The following evaluation was performed using the obtained ink.

The evaluation results are shown in Table 1.

(Evaluation of Storage Stability)

25 g of the ink obtained as described above were placed in a 30 mL bottle made of polyethylene, and subsequently, this bottle made of polyethylene was stored in a thermostat bath, which was set at 60° C., for two weeks.

The viscosities of the ink before and after the storage were measured, and the Δviscosity was calculated according to the following equation.

ΔViscosity=(Viscosity of ink after storage at 60° C. for two weeks)−(Viscosity of ink before storage)

The viscosity was measured using a VISCOMETER TV-22 (trade name, manufactured by TOKI SANGYO CO., LTD.) under the condition of an ink temperature of 30° C.

Based on the Δviscosity thus obtained, storage stability was evaluated according to the following evaluation criteria.

The smaller the Δviscosity is, the more excellent the storage stability of the ink is, which is preferable. Meanwhile, the greater the Δviscosity is, the more inferior the storage stability of the ink is.

In the following evaluation criteria, the grades A, B, and C fall in the practically acceptable range.

—Evaluation Criteria on Storage Stability—

A: Δviscosity≤0.3 mPa·s
B: 0.3 mPa·s<Δviscosity≤0.6 mPa·s
C: 0.6 mPa·s<Δviscosity≤1.0 mPa·s
D: 1.0 mPa·s<Δviscosity≤2.0 mPa·s
E: 2.0 mPa·s<Δviscosity (Evaluation of Continuous Jettability)

As the evaluation of jetting stability, the following evaluation of continuous jettability was performed.

A printer head (GELJET (registered trademark) GX5000, manufactured by Ricoh Co., Ltd.) was prepared.

This printer head was fixed to an inkjet recording apparatus having the same structure as the structure of the inkjet recording apparatus shown in FIG. 1. In this process of fixation, the printer head was arranged such that the direction of the line head of this printer head, where 96 nozzles were arranged, was inclined at an angle of 75.7 degree with respect to the direction perpendicular to the moving direction of the stage on the same plane.

Subsequently, the ink obtained as described above was jetted from the 96 nozzles continuously for 45 minutes, at an ink droplet amount of 2 pL and at a jetting frequency of 24 kHz. Here, at the time of initiation of this jetting, it was confirmed in advance that the ink was jetted from all of the 96 nozzles.

After the completion of the continuous jetting for 45 minutes, the number of nozzles which were able to jet ink until the end (the number of jetting nozzles after the completion of continuous jetting for 45 minutes) was counted. Using this number of jetting nozzles, the ink jetting rate was calculated according to the following equation, and evaluation of continuous jettability of ink was performed according to the following evaluation criteria.

Note that, the grades A, B, and C fall in the practically acceptable range.

Ink jetting rate (%)=(Number of jetting nozzles after the completion of continuous jetting for 45 minutes)/(Total number of nozzles)×100:     Equation In the equation above, the total number of nozzles is 96.
—Criteria for Evaluation of Continuous Jettability—
A: The ink jetting rate after the completion of continuous jetting for 45 minutes is 100%.
B: The ink jetting rate after the completion of continuous jetting for 45 minutes is 98% or higher but lower than 100%.
C: The ink jetting rate after the completion of continuous jetting for 45 minutes is 96% or higher but lower than 98%.
D: The ink jetting rate after the completion of continuous jetting for 45 minutes is 94% or higher but lower than 96%.
E: The ink jetting rate after the completion of continuous jetting for 45 minutes is lower than 94%.
(Evaluation of Vividness of Hue)
Using the above ink and the above inkjet recording apparatus, and setting the jetting amount at 2.0 pL, an orange solid image was drawn on each of a sheet of OK TOP COAT (registered trademark) 127 gms (manufactured by Oji Paper Co., Ltd.) and a sheet of NPI (registered trademark) FORM NEXT-IJ70 (manufactured by Nippon Paper Industries Co., Ltd.).

The obtained solid images were visually observed by five evaluators, and the evaluators scored the solid images according to the following evaluation points.

Subsequently, the average point of the evaluation points given by the five evaluators was determined, and based on the obtained average point, the hue was evaluated according to the evaluation criteria described below.
—Evaluation Points—
5: The hue of the solid image is a remarkably vivid orange hue, and the density is sufficiently high.
4: The orange hue of the solid image is vivid, and the density is high.
3: The vividness of the orange hue of the solid image is inferior and the density is low, but the vividness and the density are within the practically acceptable range.
2: The orange hue of the solid image is not vivid and the density is low, and thus the quality is practically problematic.
1: The orange hue of the solid image is not vivid at all and the density is very low, and thus the quality is practically problematic.
—Criteria for Evaluation of Hue—
A: The average point of the evaluation points given by five evaluators is from 4.5 to 5.0.
B: The average point of the evaluation points given by five evaluators is 4.0 or more but less than 4.5.
C: The average point of the evaluation points given by five evaluators is 3.5 or more but less than 4.0.
D: The average point of the evaluation points given by five evaluators is 3.0 or more but less than 3.5.
E: The average point of the evaluation points given by five evaluators is less than 3.0.

Examples 2 to 9, and Comparative Examples 1 and 2

Operation was conducted in a manner similar to that in Example 1, except that the combination of the type of pigment (A), the type of pigment (B), and the mass ratio [pigment (A)/pigment (B)] was changed to the combination shown in the following Table 1.

In Examples 2 to 9 and Comparative Examples 1 and 2, the sum of the amount of pigment (A) and the amount of pigment (B) was adjusted to the same amount as that in Example 1.

Particularly, in Comparative Examples 1 and 2, pigment (B) was not used, and pigment (A) was used in the same amount as the sum of the amount of pigment (A) and the amount of pigment (B) in Example 1.

Results are shown in Table 1.

TABLE 1

|  |  | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|
| Amount of Pigment (A) (parts by mass) | PO71 | 98 | 96 | 90 | 85 | 70 | 52 |  | 85 | 85 | 100 | 90 |
|  | PO73 |  |  |  |  |  |  | 85 |  |  |  | 10 |
| Amount of Pigment (B) (parts by mass) | PR254 | 2 | 4 | 10 | 15 | 30 | 48 | 15 |  |  |  |  |
|  | PR255 |  |  |  |  |  |  |  | 15 |  |  |  |
|  | PR264 |  |  |  |  |  |  |  |  | 15 |  |  |

TABLE 1-continued

|  |  | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|
|  | Mass Ratio [Pigment (A)/Pigment (B)] | 49 | 24 | 9.0 | 5.7 | 2.3 | 1.1 | 5.7 | 5.7 | 5.7 | — | — |
|  | Volume Average Particle Diameter of Resin-Coated Pigment Particles (nm) | 160 | 156 | 153 | 145 | 138 | 140 | 150 | 155 | 160 | 175 | 170 |
| Evaluation Results | Storage Stability | C | B | B | A | A | B | B | B | B | D | C |
|  | Continuous Jettability | C | B | A | A | A | A | A | A | A | D | D |
|  | Vividness of Hue | B | B | A | A | A | B | B | B | B | C | C |

As shown in Table 1, the inks (pigment dispersions) of Examples 1 to 9, in which the mass ratio [pigment (A)/pigment (B)] (namely, the content mass ratio of pigment (A) relative to pigment (B) in the ink) is higher than 1.0, exhibited excellent storage stability and excellent continuous jettability (namely, jetting stability; hereinafter the same applies.).

In contrast, the ink of Comparative Example 1 exhibited inferior storage stability and inferior continuous jettability, and the ink of Comparative Example 2 exhibited inferior continuous jettability.

Furthermore, the images formed by using each of the inks of Examples 1 to 9 also had excellent vividness of orange hue, as compared with the images formed by using each of the inks of Comparative Examples 1 and 2.

Among the inks of Examples 1 to 9, the inks of Examples 2 to 9, in which the mass ratio [pigment (A)/pigment (B)] is within the range of from 1.1 to 25, exhibited particularly excellent storage stability and particularly excellent continuous jettability.

Among the inks of Examples 2 to 9, the inks of Examples 3 to 9, in which the mass ratio [pigment (A)/pigment (B)] is within the range of from 1.1 to 10, exhibited particularly excellent continuous jettability.

Example 101

Operation was conducted in a manner similar to that in Example 4, except that the ink composition in Example 4 was changed to the following composition. Results are shown in Table 2.

—Composition of Ink (Orange Ink) of Example 101—

| | |
|---|---|
| Dispersion liquid of resin-coated pigment particles in Example 4 | 30% by mass |
| SANNIX GP-250 (trade name; water soluble solvent) | 5.0% by mass |
| PG (propylene glycol; water soluble solvent) | 10.0% by mass |
| OLFINE E1010 (trade name, manufactured by Nissin Chemical Industry Co., Ltd.; surfactant) | 1.0% by mass |
| Urea | 5.0% by mass |
| Self-dispersing polymer particles B-01 (resin particles) described below | 8% by mass |
| Ion exchanged water | remaining amount that provides a total amount of 100% by mass |

—Preparation of Self-Dispersing Polymer Particles B-01—

Preparation of self-dispersing polymer particles B-01 was conducted as follows.

560.0 g of methyl ethyl ketone were placed in a 2 liter three-necked flask equipped with a stirrer, a thermometer, a reflux condenser tube, and a nitrogen gas inlet tube, and were heated to a temperature of 87° C. Subsequently, while maintaining the refluxed state in the reaction vessel (thereafter, the refluxed state was maintained until the reaction was completed), to the methyl ethyl ketone in the reaction vessel, a mixed solution including 220.4 g of methyl methacrylate, 301.6 g of isobornyl methacrylate, 58.0 g of methacrylic acid, 108 g of methyl ethyl ketone, and 2.32 g of "V-601" (trade name, a polymerization initiator manufactured by Wako Pure Chemical Industries, Ltd.; dimethyl 2,2'-azobis (2-methylpropionate)) was added dropwise at a constant speed such that the dropwise addition was completed in two hours. After the dropwise addition was completed, the resulting mixture was stirred for one hour. Thereafter, with respect to the solution that had been stirred for one hour, operation of the following process (1) was conducted.

Process (1): a solution including 1.16 g of "V-601" and 6.4 g of methyl ethyl ketone was added, and the resulting mixture was stirred for two hours.

Subsequently, the operation of the above process (1) was repeated four times. Then, a solution including 1.16 g of "V-601" and 6.4 g of methyl ethyl ketone was further added, and stirring was continued for three hours (the operation conducted so far is designated as "reaction").

After the completion of the reaction, the temperature of the solution was lowered to 65° C., then 163.0 g of isopropanol were added thereto, and the resulting mixture was cooled while leaving it standing still. In this way, a polymer solution (solids concentration of 41.0%) containing a methyl methacrylate/isobornyl methacrylate/methacrylic acid (=38/52/10 [mass ratio]) copolymer was obtained.

The above copolymer had a weight average molecular weight (Mw) of 63,000, and an acid value of 65.1 (mgKOH/g).

Next, 317.3 g of the polymer solution thus obtained was weighed (solids concentration of 41.0%) and, to the polymer solution, 46.4 g of isopropanol, 1.65 g of a 20% aqueous solution of maleic anhydride (water soluble acidic compound, equivalent to 0.3% with respect to the copolymer, in terms of maleic acid), and 40.77 g of a 2 mol/L aqueous solution of NaOH were added. The temperature of the liquid in the reaction vessel was elevated to 70° C.

Subsequently, to the solution whose temperature had been elevated to 70° C., 380 g of distilled water were added dropwise at a speed of 10 mL/min, and the resulting mixture was subjected to water dispersion (dispersion process).

Thereafter, the temperature of the liquid in the reaction vessel was kept at 70° C. under reduced pressure for 1.5 hours to distill off the isopropanol, methyl ethyl ketone, and distilled water in a total distilled amount of 287.0 g (solvent removing process). To the liquid thus obtained, 0.278 g (440 ppm with respect to the solids of the polymer, in terms of benzoisothiazolin-3-one) of PROXEL GXL (S) (trade name, manufactured by Arch Chemicals Japan, Inc.) were added.

The obtained liquid was filtrated using a filter having a pore size of 1 μm, and the filtrate was collected, to obtain an aqueous dispersion of self-dispersing polymer particles B-01, the aqueous dispersion having a solids concentration of 26.5%.

The aqueous dispersion of self-dispersing polymer particles B-01 thus obtained was diluted with ion exchanged water, thereby preparing a liquid having a solids concentration of 25.0%. The physical properties of the obtained liquid having a solids concentration of 25.0% were measured and, as a result, the pH was 7.8, the electric conductivity was 461 mS/m, and the viscosity was 14.8 mPa·s.

Example 102 and Comparative Example 101

With regard to Example 102, operation was conducted in a manner similar to that in Example 101 except that the "dispersion liquid of resin-coated pigment particles in Example 4" in Example 101 was changed to the dispersion liquid of resin coated pigment particles in Example 5, and with regard to Comparative Example 101, operation was conducted in a manner similar to that in Example 101 except that the "dispersion liquid of resin-coated pigment particles in Example 4" in Example 101 was changed to the dispersion liquid of resin coated pigment particles in Comparative Example 1.

Results are shown in Table 2.

TABLE 2

| | | Example 101 | Example 102 | Comparative Example 101 |
|---|---|---|---|---|
| Amount of Pigment (A) (parts by mass) | PO71 | 85 | 70 | 100 |
| Amount of Pigment (B) (parts by mass) | PR254 | 15 | 30 | — |
| Mass Ratio [Pigment (A)/Pigment (B)] | | 5.7 | 2.3 | — |
| Evaluation Results | Storage Stability | A | A | E |
| | Continuous Jettability | A | A | E |

As shown in Table 1 and Table 2, in the ink of Comparative Example 101 (see Table 2) which contains resin particles (self-dispersing polymer particles; hereinafter the same applies.) and contains pigment (A), but does not contain pigment (B), the storage stability and continuous jettability were further lowered, as compared with the ink of Comparative Example 1 (see Table 1) which does not contain resin particles, and contains pigment (A), but does not contain pigment (B).

In contrast, the ink of Example 101 (see Table 2) which contains resin particles, pigment (A), and pigment (B) exhibited equivalent storage stability and continuous jettability to those of the ink of Example 4 (see Table 1) which does not contain resin particles but contains pigment (A) and pigment (B).

Similarly, in the ink of Example 102 (see Table 2) which contains resin particles, pigment (A), and pigment (B), equivalent storage stability and continuous jettability to those of the ink of Example 5 (see Table 1) which does not contain resin particles but contains pigment (A) and pigment (B) were maintained.

From the above results, it is confirmed that, in a case in which the ink contains resin particles, the improvement effects on the storage stability and continuous jettability due to pigment (B) are more remarkably exhibited (namely, more drastic improvements are obtained), as compared with the case in which the ink does not contain resin particles.

[Example of Image Formation Using Treatment Liquid]

When an image is formed by using the ink of Example 101 or Example 102, each of which contains resin particles, and a treatment liquid containing an acid that aggregates components in the ink, the rub resistance of the image can be further improved, as compared with the case of forming an image without using the treatment liquid.

(Treatment Liquid)

As the treatment liquid, for example, a treatment liquid having the following composition can be used.

Concerning the physical properties of the treatment liquid having the following composition, for example, the viscosity is 2.9 mPa·s (at 25° C.), the surface tension is 41.0 mN/m (at 25° C.), and the pH is 0.7 (at 25° C.).

Here, the viscosity, the surface tension, and the pH are measured using a VISCOMETER TV-22 (trade name, manufactured by TOKI SANGYO CO., LTD.), an AUTOMATIC SURFACE TENSIOMETER CBVP-Z (trade name, manufactured by Kyowa Interface Science Co., Ltd.), and a pH meter WM-50EG (trade name, manufactured by DKK-TOA Corporation), respectively.

—Composition of Treatment Liquid—

| | |
|---|---|
| TPGmME (tripropylene glycol monomethyl ether) | 4.8% by mass |
| DEGmBE (diethylene glycol monobutyl ether) | 4.8% by mass |
| Malonic acid | 9.0% by mass |
| Malic acid | 8.0% by mass |
| Propanetricarboxylic acid | 2.5% by mass |
| 85% by mass aqueous solution of phosphoric acid | 6.0% by mass |
| Water soluble polymer 1 described below | 0.5% by mass |
| Antifoaming agent (trade name: TSA-739 (15%), manufactured by Momentive Performance Materials Japan LLC; emulsion type silicone antifoaming agent) | 0.01% by mass, in terms of the amount of silicone oil |
| Benzotriazole | 1.0% by mass |
| Ion exchanged water | remaining amount that provides a total amount of 100% by mass |

Water Soluble Polymer 1

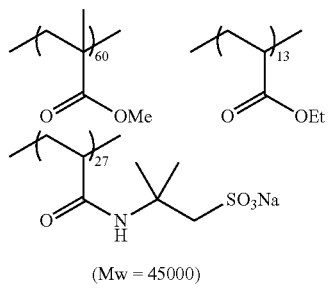

(Mw = 45000)

The water soluble polymer 1 can be synthesized in accordance with the method described in paragraphs 0200 to 0204, and 0229 of JP-A No. 2013-001854.

(Image Formation)

An example of the image forming method using the treatment liquid is shown below.

In a manner similar to that in the evaluation of continuous jettability in Example 1, a GELJET (registered trademark) GX5000 printer head manufactured by Ricoh Co., Ltd. (namely, a line head having an array of 96 nozzles) is prepared. This printer head is fixed and arranged to an inkjet recording apparatus having the same structure as the structure of the inkjet recording apparatus shown in FIG. 1 described above.

As the recording medium, for example, a sheet of OK TOP COAT (registered trademark) (manufactured by Oji Paper Co., Ltd.) is prepared. The following treatment liquid application process, ink application process, and drying process are successively carried out, whereby an image is formed (recorded) on the recording medium.

—Treatment Liquid Application Process—

A sheet of OK TOP COAT (registered trademark) that serves as the recording medium is fixed on the stage of the inkjet recording apparatus. Subsequently, while moving the stage, on which the recording medium is fixed, in a linear direction at a constant velocity of 500 mm/sec, the treatment liquid described above is coated on the recording medium, using a wire bar coater such that the coating amount is about 1.5 g/m².

At the area where the application of the treatment liquid is completed, drying of the treatment liquid is initiated using a dryer under the condition of 50° C., after 1.5 seconds from the time of completion of the application of the treatment liquid to this area. The drying operation is completed after 3.5 seconds from the time of completion of the application of the treatment liquid. In this process, the drying time is 2 seconds.

—Ink Application Process—

While moving the recording medium, in which drying of the treatment liquid is completed, at a constant velocity of 50 mm/sec in terms of stage moving velocity, the ink of Example 101 or Example 102 is jetted from the printer head by a line system to the surface of the recording medium, to which the treatment liquid has been applied, thereby forming an image. Jetting of the ink is initiated within 2 seconds after the completion of drying of the treatment liquid.

The ink jetting conditions are, for example, as follows: the ink droplet amount is 3.5 pL, the jetting frequency is 24 kHz, and the resolution is 1200 dpi×1200 dpi (dots per inch).

—Drying Process—

Immediately after printing, the image is dried at 70° C. for 10 seconds.

In this way, an image having particularly excellent rub resistance can be formed.

All publications, patent applications, and technical standards mentioned in this specification are herein incorporated by reference to the same extent as if each individual publication, patent application, or technical standard was specifically and individually indicated to be incorporated by reference.

What is claimed is:

1. A pigment dispersion for ink jetting, comprising:
   a pigment (A) represented by the following Formula (A);
   a pigment (B) represented by the following Formula (B); and
   water, a content of water in the pigment dispersion being 40% by mass or greater with respect to an entire content of the pigment dispersion,
   wherein a content mass ratio of the pigment (A) to the pigment (B) is higher than 1.0:

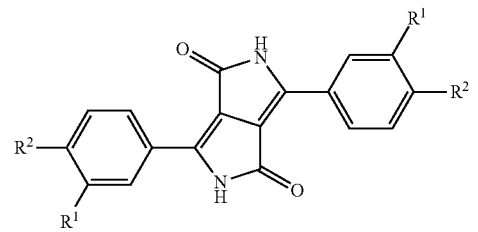

wherein, in Formula (A), each of two $R^1$s represents a cyano group and each of two $R^2$s represents a hydrogen atom, or each of two $R^1$s represents a hydrogen atom and each of two $R^2$s represents a tertiary butyl group,

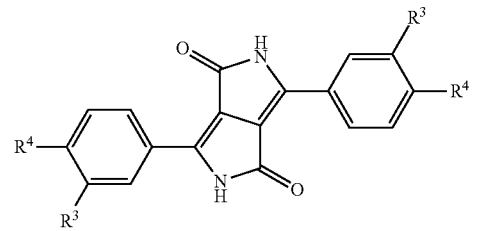

wherein, in Formula (B), each of two $R^3$s represents a hydrogen atom and each of two $R^4$s represents a chlorine atom, each of two $R^3$s represents a hydrogen atom and each of two $R^4$s represents a hydrogen atom, or each of two $R^3$s represents a hydrogen atom and each of two $R^4$s represents a phenyl group.

2. The pigment dispersion for ink jetting according to claim 1, wherein the content mass ratio of the pigment (A) to the pigment (B) is from 1.1 to 50.

3. The pigment dispersion for ink jetting according to claim 1, wherein the content mass ratio of the pigment (A) to the pigment (B) is from 1.1 to 25.

4. The pigment dispersion for ink jetting according to claim 1, wherein the content mass ratio of the pigment (A) to the pigment (B) is from 1.1 to 10.

5. The pigment dispersion for ink jetting according to claim 1, wherein, in Formula (A), each of two $R^1$s represents a cyano group and each of two $R^2$s represents a hydrogen atom.

6. The pigment dispersion for ink jetting according to claim 1, wherein, in Formula (B), each of two $R^3$s represents a hydrogen atom and each of two $R^4$s represents a chlorine atom.

7. The pigment dispersion for ink jetting according to claim 1, wherein, in Formula (A), each of two $R^1$s represents a cyano group and each of two $R^2$s represents a hydrogen atom, and wherein, in Formula (B), each of two $R^3$s represents a hydrogen atom and each of two $R^4$s represents a chlorine atom.

8. The pigment dispersion for ink jetting according to claim 1, further comprising resin particles.

9. The pigment dispersion for ink jetting according to claim 1, further comprising a resin dispersant.

10. The pigment dispersion for ink jetting according to claim 1, further comprising a water soluble solvent.

11. A method of producing the pigment dispersion for ink jetting according to claim 1, the method comprising a process of obtaining the pigment dispersion for ink jetting by mixing at least the pigment (A), the pigment (B), and water, and subjecting a resulting mixture to a dispersion treatment.

12. The method according to claim 11, wherein the process of obtaining the pigment dispersion for ink jetting comprises:
- a process of obtaining a pigment mixture by mixing the pigment (A) and the pigment (B); and
- a process of obtaining the pigment dispersion for ink jetting by mixing at least the pigment mixture and water, and subjecting a resulting mixture to a dispersion treatment.

13. An ink set, comprising:
- an ink that is the pigment dispersion for ink jetting according to claim 1; and
- a treatment liquid containing an acid that aggregates components contained in the ink.

14. An image forming method, comprising:
- an ink application process of applying, onto a recording medium, an ink that is the pigment dispersion for ink jetting according to claim 1, by an inkjet method, to form an image; and
- a treatment liquid application process of applying, onto the recording medium, a treatment liquid containing an acid that aggregates components contained in the ink.

* * * * *